US012289336B2

(12) United States Patent
Engelberg et al.

(10) Patent No.: US 12,289,336 B2
(45) Date of Patent: Apr. 29, 2025

(54) ONTOLOGY-BASED RISK PROPAGATION OVER DIGITAL TWINS

(71) Applicant: Accenture Global Solutions Limited, Dublin (IE)

(72) Inventors: Gal Engelberg, Pardes-hana (IL); Eitan Hadar, Nesher (IL); Dan Klein, Rosh Ha'ayin (IL); Adrian Kuboszek, Dolnoslaskie (PL)

(73) Assignee: Accenture Global Solutions Limited, Dublin (IE)

( * ) Notice: Subject to any disclaimer, the term of this patent is extended or adjusted under 35 U.S.C. 154(b) by 239 days.

(21) Appl. No.: 18/194,791

(22) Filed: Apr. 3, 2023

(65) Prior Publication Data

US 2023/0328096 A1    Oct. 12, 2023

(30) Foreign Application Priority Data

Apr. 8, 2022   (PL) .......................... 440887

(51) Int. Cl.
*H04L 9/40*       (2022.01)
(52) U.S. Cl.
CPC ...... *H04L 63/1433* (2013.01); *H04L 63/1441* (2013.01)
(58) Field of Classification Search
CPC .................. H04L 63/1433; H04L 63/1441
(Continued)

(56) References Cited

U.S. PATENT DOCUMENTS 5,521,910 A   5/1996 Matthews
6,279,113 B1  8/2001 Vaidya
(Continued)

FOREIGN PATENT DOCUMENTS

EP   1559008   8/2005
EP   1768043   3/2007
(Continued)

OTHER PUBLICATIONS

Bitton et al., "Evaluating the Information Security Awareness of Smartphone Users," Presented at Proceedings of the 2020 CHI Conference on Human Factors in Computing Systems, Honolulu, HI, USA, Apr. 25-30, 2020, 13 pages.
ElevateSecurity.com [online], "Elevate Security," available on or before Nov. 12, 2019 via Internet Archive: Wayback Machine URL<https://web.archive.org/web/20191112143643/https://elevatesecurity.com/>, retrieved on Oct. 31, 2023, retrieved from URL<https://elevatesecurity.com/>, 9 pages.
(Continued)

*Primary Examiner* — Teshome Hailu
(74) *Attorney, Agent, or Firm* — Polsinelli PC

(57) ABSTRACT

Implementations are directed to methods, systems, and apparatus for ontology-based risk propagation over digital twins. Actions include obtaining knowledge graph data defining a knowledge graph including nodes and edges between the nodes, the nodes including asset nodes representing assets and process nodes representing processes; each edge representing a relation between nodes; determining, from the knowledge graph, an aggregated risk for a first process represented by a first process node, including: identifying, for the first process node, a set of incoming nodes, each incoming node comprising an asset node or a process node and being connected to the first process node by a respective edge; determining a direct risk for the first process; and determining an indirect risk for the first process; and generating, based on the aggregated risk for the first process node, a mitigation recommendation including actions for reducing the aggregated risk for the first process node.

20 Claims, 13 Drawing Sheets

(58) Field of Classification Search
USPC .......................................................... 726/25
See application file for complete search history.

(56) References Cited

U.S. PATENT DOCUMENTS

| | | |
|---|---|---|
| 6,487,666 B1 | 11/2002 | Shanklin et al. |
| 7,540,025 B2 | 5/2009 | Tzadikario |
| 7,703,138 B2 | 4/2010 | Desai et al. |
| 7,904,962 B1 | 3/2011 | Jajodia et al. |
| 8,099,760 B2 | 1/2012 | Cohen et al. |
| 8,176,561 B1 | 5/2012 | Hurst et al. |
| 8,656,493 B2 | 2/2014 | Capalik |
| 8,881,288 B1 | 11/2014 | Levy et al. |
| 9,256,739 B1 | 2/2016 | Roundy et al. |
| 9,563,771 B2 | 2/2017 | Lang et al. |
| 9,633,306 B2 | 4/2017 | Liu et al. |
| 10,084,804 B2 | 9/2018 | Kapadia et al. |
| 10,291,645 B1 | 5/2019 | Frantzen et al. |
| 10,382,473 B1 | 8/2019 | Ashkenazy et al. |
| 10,447,721 B2 | 10/2019 | Lasser |
| 10,447,727 B1 | 10/2019 | Hecht |
| 10,601,854 B2 | 3/2020 | Lokamathe et al. |
| 10,642,840 B1 | 5/2020 | Attaluri et al. |
| 10,659,488 B1 | 5/2020 | Rajasooriya et al. |
| 10,771,492 B2 | 9/2020 | Hudis et al. |
| 10,848,515 B1 * | 11/2020 | Pokhrel ............... H04L 63/1433 |
| 10,868,825 B1 | 12/2020 | Dominessy et al. |
| 10,873,533 B1 | 12/2020 | Ismailsheriff et al. |
| 10,956,566 B2 | 3/2021 | Shu et al. |
| 10,958,667 B1 | 3/2021 | Maida et al. |
| 11,089,040 B2 | 8/2021 | Jang et al. |
| 11,128,654 B1 | 9/2021 | Joyce et al. |
| 11,159,555 B2 | 10/2021 | Hadar et al. |
| 11,184,385 B2 | 11/2021 | Hadar et al. |
| 11,232,235 B2 | 1/2022 | Hadar et al. |
| 11,277,431 B2 | 3/2022 | Hassanzadeh et al. |
| 11,281,806 B2 | 3/2022 | Hadar et al. |
| 11,283,824 B1 | 3/2022 | Berger et al. |
| 11,283,825 B2 | 3/2022 | Grabois et al. |
| 11,411,976 B2 | 8/2022 | Basovskiy et al. |
| 11,483,213 B2 | 10/2022 | Engelberg et al. |
| 11,533,332 B2 | 12/2022 | Engelberg et al. |
| 2005/0138413 A1 | 6/2005 | Lippmann et al. |
| 2005/0193430 A1 | 9/2005 | Cohen et al. |
| 2006/0037077 A1 | 2/2006 | Gadde et al. |
| 2008/0044018 A1 | 2/2008 | Scrimsher et al. |
| 2008/0289039 A1 | 11/2008 | Rits et al. |
| 2008/0301765 A1 | 12/2008 | Nicol et al. |
| 2009/0077666 A1 | 3/2009 | Chen et al. |
| 2009/0138590 A1 | 5/2009 | Lee et al. |
| 2009/0307772 A1 | 12/2009 | Markham et al. |
| 2009/0319248 A1 | 12/2009 | White et al. |
| 2010/0058456 A1 | 3/2010 | Jajodia et al. |
| 2010/0138925 A1 | 7/2010 | Barai et al. |
| 2010/0174670 A1 | 7/2010 | Malik et al. |
| 2011/0035803 A1 | 2/2011 | Lucangeli Obes et al. |
| 2011/0061104 A1 | 3/2011 | Sarraute Yamada et al. |
| 2011/0093916 A1 | 4/2011 | Lang et al. |
| 2011/0093956 A1 | 4/2011 | Laarakkers et al. |
| 2013/0097125 A1 | 4/2013 | Marvasti et al. |
| 2013/0219503 A1 | 8/2013 | Amnon et al. |
| 2014/0082738 A1 | 3/2014 | Bahl |
| 2014/0173740 A1 | 6/2014 | Albanese et al. |
| 2015/0047026 A1 | 2/2015 | Neil et al. |
| 2015/0106867 A1 | 4/2015 | Liang |
| 2015/0199207 A1 | 7/2015 | Lin et al. |
| 2015/0261958 A1 | 9/2015 | Hale et al. |
| 2015/0326601 A1 | 11/2015 | Grondin et al. |
| 2015/0350018 A1 | 12/2015 | Hui et al. |
| 2016/0105454 A1 | 4/2016 | Li et al. |
| 2016/0205122 A1 | 7/2016 | Bassett |
| 2016/0277423 A1 | 9/2016 | Apostolescu et al. |
| 2016/0292599 A1 | 10/2016 | Andrews et al. |
| 2016/0301704 A1 | 10/2016 | Hassanzadeh et al. |
| 2016/0301709 A1 | 10/2016 | Hassanzadeh et al. |
| 2017/0012836 A1 | 1/2017 | Tongaonkar et al. |
| 2017/0032130 A1 | 2/2017 | Joseph et al. |
| 2017/0041334 A1 | 2/2017 | Kahn et al. |
| 2017/0078322 A1 | 3/2017 | Seiver et al. |
| 2017/0085595 A1 | 3/2017 | Ng et al. |
| 2017/0163506 A1 | 6/2017 | Keller |
| 2017/0230410 A1 | 8/2017 | Hassanzadeh et al. |
| 2017/0318050 A1 | 11/2017 | Hassanzadeh et al. |
| 2017/0324768 A1 | 11/2017 | Crabtree et al. |
| 2017/0364702 A1 | 12/2017 | Goldfarb et al. |
| 2017/0366416 A1 | 12/2017 | Beecham et al. |
| 2018/0013771 A1 | 1/2018 | Crabtree et al. |
| 2018/0103052 A1 | 4/2018 | Choudhury et al. |
| 2018/0152468 A1 | 5/2018 | Nor et al. |
| 2018/0159890 A1 | 6/2018 | Warnick et al. |
| 2018/0183827 A1 | 6/2018 | Zorlular et al. |
| 2018/0205755 A1 * | 7/2018 | Kavi ..................... G06F 21/577 |
| 2018/0255077 A1 | 9/2018 | Paine |
| 2018/0255080 A1 | 9/2018 | Paine |
| 2018/0295154 A1 * | 10/2018 | Crabtree ............. H04L 63/1433 |
| 2018/0367548 A1 | 12/2018 | Stokes, III et al. |
| 2019/0052663 A1 | 2/2019 | Lee et al. |
| 2019/0052664 A1 | 2/2019 | Kibler et al. |
| 2019/0132344 A1 | 5/2019 | Lem et al. |
| 2019/0141058 A1 | 5/2019 | Hassanzadeh et al. |
| 2019/0182119 A1 | 6/2019 | Ratkovic et al. |
| 2019/0188389 A1 | 6/2019 | Peled et al. |
| 2019/0230129 A1 | 7/2019 | Digiambattista et al. |
| 2019/0312898 A1 | 10/2019 | Verma et al. |
| 2019/0319987 A1 | 10/2019 | Levy et al. |
| 2019/0362279 A1 | 11/2019 | Douglas |
| 2019/0373005 A1 | 12/2019 | Bassett |
| 2020/0014718 A1 | 1/2020 | Joseph Durairaj et al. |
| 2020/0042328 A1 | 2/2020 | Gupta |
| 2020/0042712 A1 | 2/2020 | Foo et al. |
| 2020/0045069 A1 | 2/2020 | Nanda et al. |
| 2020/0099704 A1 | 3/2020 | Lee et al. |
| 2020/0112487 A1 | 4/2020 | Inamdar et al. |
| 2020/0128047 A1 | 4/2020 | Biswas et al. |
| 2020/0137104 A1 | 4/2020 | Hassanzadeh et al. |
| 2020/0175175 A1 | 6/2020 | Hadar et al. |
| 2020/0177615 A1 | 6/2020 | Grabois et al. |
| 2020/0177616 A1 | 6/2020 | Hadar et al. |
| 2020/0177617 A1 | 6/2020 | Hadar et al. |
| 2020/0177618 A1 | 6/2020 | Hassanzadeh et al. |
| 2020/0177619 A1 | 6/2020 | Hadar et al. |
| 2020/0272972 A1 | 8/2020 | Harry et al. |
| 2020/0296137 A1 | 9/2020 | Crabtree et al. |
| 2020/0296138 A1 * | 9/2020 | Crabtree ............. H04L 63/1425 |
| 2020/0311630 A1 | 10/2020 | Risoldi et al. |
| 2020/0351295 A1 | 11/2020 | Nhlabatsi et al. |
| 2020/0358804 A1 | 11/2020 | Crabtree et al. |
| 2020/0412767 A1 * | 12/2020 | Crabtree ............. H04L 63/1441 |
| 2021/0006582 A1 | 1/2021 | Yamada et al. |
| 2021/0014265 A1 | 1/2021 | Hadar et al. |
| 2021/0021644 A1 * | 1/2021 | Crabtree ............... G06F 16/951 |
| 2021/0099490 A1 | 4/2021 | Crabtree et al. |
| 2021/0105294 A1 | 4/2021 | Kruse et al. |
| 2021/0168175 A1 | 6/2021 | Crabtree et al. |
| 2021/0173711 A1 | 6/2021 | Crabtree et al. |
| 2021/0218770 A1 | 7/2021 | Ben-Yosef et al. |
| 2021/0248443 A1 | 8/2021 | Shu et al. |
| 2021/0273978 A1 | 9/2021 | Hadar et al. |
| 2021/0288995 A1 | 9/2021 | Attar et al. |
| 2021/0336981 A1 | 10/2021 | Akella et al. |
| 2021/0409426 A1 | 12/2021 | Engelberg et al. |
| 2021/0409439 A1 | 12/2021 | Engelberg et al. |
| 2022/0014445 A1 | 1/2022 | Engelberg et al. |
| 2022/0014534 A1 | 1/2022 | Basovskiy et al. |
| 2022/0021698 A1 | 1/2022 | Hadar et al. |
| 2022/0038491 A1 | 2/2022 | Hadar et al. |
| 2022/0051111 A1 | 2/2022 | Hadar et al. |
| 2022/0070202 A1 | 3/2022 | Busany et al. |
| 2022/0124115 A1 | 4/2022 | Grabois et al. |
| 2022/0129590 A1 | 4/2022 | Hadar et al. |
| 2022/0131894 A1 | 4/2022 | Hassanzadeh et al. |
| 2022/0150270 A1 | 5/2022 | Klein et al. |
| 2022/0182406 A1 | 6/2022 | Inokuchi |
| 2022/0188460 A1 | 6/2022 | Hadar et al. |

(56) References Cited

U.S. PATENT DOCUMENTS

| | | | |
|---|---|---|---|
| 2022/0263855 | A1 | 8/2022 | Engelberg et al. |
| 2022/0337617 | A1 | 10/2022 | Basovskiy et al. |
| 2023/0021961 | A1 | 1/2023 | Engelberg et al. |
| 2023/0034910 | A1 | 2/2023 | Engelberg et al. |
| 2023/0067128 | A1 | 3/2023 | Engelberg et al. |
| 2023/0067777 | A1 | 3/2023 | Hadar et al. |
| 2023/0076372 | A1 | 3/2023 | Engelberg et al. |

FOREIGN PATENT DOCUMENTS

| | | |
|---|---|---|
| EP | 2385676 | 11/2011 |
| EP | 2816773 | 12/2014 |
| EP | 3644579 | 4/2020 |
| EP | 3664411 | 6/2020 |
| EP | 4047870 | 8/2022 |
| WO | WO 2018/002484 | 1/2018 |
| WO | WO 2020/242275 | 12/2020 |

OTHER PUBLICATIONS

Solomon et al., "Contextual security awareness: A context-based approach for assessing the security awareness of users," Knowledge-Based Systems, Jun. 21, 2022, 246:108709, 15 pages.
Splunk.com [online], "Splunk Enterprise Security," available on or before May 22, 2022 via Internet Archive: Wayback Machine URL<https://web.archive.org/web/20220522034713/https://www.splunk.com/en_us/products/enterprise-security.html>, retrieved on Oct. 31, 2023, retrieved from URL<https://www.splunk.com/en_us/products/enterprise-security.html>, 8 pages.
Splunk.com [online], "Splunk User Behavior Analytics," available on or before Jun. 14, 2022 via Internet Archive: Wayback Machine URL<https://web.archive.org/web/20220614130647/https://www.splunk.com/en_us/products/user-behavior-analytics.html>, retrieved on Oct. 31, 2023, retrieved from URL<https://www.splunk.com/en_us/products/user-behavior-analytics.html>, 9 pages.
Wikipedia.org [online], "PageRank," last updated Oct. 19, 2023, retrieved on Oct. 31, 2023, retrieved via URL<https://en.wikipedia.org/wiki/PageRank>, 15 pages.
Engelberg et al., "An Ontology-Driven Approach for Process-Aware Risk Propagation," Presented at Proceedings of the 38th ACM/SIGAPP Symposium on Applied Computing, Mar. 27-31, 2023, Tallinn, Estonia, 1742-1745.
EP Extended Search Report in European Appln. No. 23166678.5 dated Aug. 23, 2023, 7 pages.
Liu et al., "Modelling a large scale system for risk assessment," Presented at Proceedings of the 2015 International Conference on Industrial Engineering and Systems Management (IESM), Oct. 21-23, 2015, Seville, Spain, 6 pages.
3DS.com [online], "New Customer Experience," available on or before Aug. 7, 2020 via Internet Archive: Wayback Machine URL<https://web.archive.org/web/20200807204455/https://ifwe.3ds.com/transportation-mobility/new-customer-experience>, retrieved on Jul. 9, 2021, retrieved from URL<https://ifwe.3ds.com/transportation-mobility/new-customer-experience>, 9 pages.
Abraham et al. "A Predictive Framework for Cyber Security Analytics Using Attack Graphs." International Journal of Computer Networks & Communications (IJCNC). vol. 7, No. 1, Jan. 2015. (Year: 2015).
Abraham et al., "Cyber Security Analytics: A Stochastic Model for Security Quantification Using Absorbing Markov Chains," Journal of Communications, Dec. 2014, 9(12): 899-907.
Almeida et al., "An ontological analysis of the notion of community in the RM-ODP enterprise language," Computer Standards & Interfaces, Mar. 2013, 35(3):257-268.
Alvarenga et al., "Discovering Attack Strategies Using Process Mining," Presented at Proceedings of The Eleventh Advanced International Conference on Telecommunications, Brussels, Belgium, Jun. 21-26, 2015, 119-125.

Amar et al., "Using finite-state models for log differencing," Proceedings of the 2018 26th ACM Joint Meeting on European Software Engineering Conference and Symposium on the Foundations of Software Engineering (ESEC/FSE 2018), Lake Buena Vista, Florida, Nov. 4-9, 2018, 49-59.
Annane et al., "BBO: BPMN 2.0 based ontology for business process representation," Presented at Proceedings of the 20th European Conference on Knowledge Management (ECKM 2019), Lisbonne, Portugal, Sep. 5-6, 2019, 49-59.
Ashton et al., "That 'internet of things' thing, " RFID Journal, Jun. 22, 2009, 1 page.
Atoum et al., "A holistic cyber security implementation framework," Information Management & Computer Security, Jul. 2014, 22(3):251-264.
Barik et al., "Attack Graph Generation and Analysis Techniques," Defence Science Journal, Nov. 2016, 66(6):559-567.
Barrère et al., "Naggen: a Network Attack Graph GENeration Tool—IEE CNS 17 Poster," 2017 IEEE Conference on Communications and Network Security, Oct. 2017, Las Vegas, NV, USA, 378-379.
Bonacich, "Power and Centrality: A Family of Measures," American Journal of Sociology, Mar. 1987, 92(5):1170-1182.
Borgatti et al., "A Graph-theoretic perspective on centrality," Social Networks, Oct. 2006, 28(4):466-484.
Borgo et al., "Ontological Foundations of DOLCE," Theory and Applications of Ontology: Computer Applications, Aug. 5, 2010, 279-295.
Brazhuk, "Towards automation of threat modeling based on a semantic model of attack patterns and weaknesses," arXiv, Dec. 8, 2021, arXiv:2112.04231v1, 14 pages.
Burger et al., "Scaling to the end of silicon with edge architectures," Computer, Jul. 2004, 37(7):44-55.
Challenge.org [online], "Incorporating digital twin into internet cyber security—creating a safer future," May 2018, retrieved on Jul. 9, 2021, retrieved from URL<https://www.challenge.org/insights/digital-twin-cyber-security/>, 10 pages.
Chen et al., "Distributed Attack Modeling Approach Based on Process Mining and Graph Segmentation," Entropy, Sep. 2020, 22(9):1026, 21 pages.
Chen Zhong, Towards Agile Cyber Analysis: Leveraging Visualization as Functions in Collaborative Visual Analytics, IEEE:2017, pp. 1-2.
Cohen-Addad et al., "Hierarchical Clustering: Objective Functions and Algorithms," Journal of the ACM, Jun. 2019, 66(4):26, 42 pages.
Coltellese et al., "Triage of IoT Attacks Through Process Mining," Presented at Proceedings of on the Move to Meaningful Internet Systems Conference 2019, Rhodes, Greece, Oct. 21-25, 2019; Lecture Notes in Computer Science, Oct. 2019, 11877:326-344.
Cravero, "Big data architectures and the internet of things: A systematic mapping study," IEEE Latin America Transactions, Apr. 2018, 16(4):1219-1226.
CyberSecurity Works.com [online], "MITRE Mapping of CISA KEVs and its Challenges," Jun. 29, 2022, retrieved on Oct. 4, 2022, retrieved from URL<https://cybersecurityworks.com/blog/cisa/mitre-mapping-of-cisa-kevs-and-its-challenges.html>, 6 pages.
Cycognito.com [online], "Identifying and Managing Vulnerabilities on All Your Attacker-Exposed Assets, All the Time: Benefits of the CyCognito Platform for Vulnerability Management," available on or before Oct. 22, 2020 via Internet Archive: Wayback Machine URL<https://web.archive.org/web/20201022120625/https://www.cycognito.com/vulnerability-management>, retrieved on Oct. 4, 2022, retrieved from URL<https://www.cycognito.com/vulnerability-management>, 15 pages.
Daniele et al., "An ontological approach to logistics," Enterprise Interoperability: Research and Applications in the Service-oriented Ecosystem, Oct. 11, 2013, 199-213.
Das et al., "V2W-BERT: A Framework for Effective Hierarchical Multiclass Classification of Software Vulnerabilities," CoRR, submitted on Feb. 23, 2021, arXiv:2102.11498v1, 11 pages.

(56) References Cited

OTHER PUBLICATIONS

Degen et al., "Gol: toward an axiomatized upper-level ontology," Presented at Proceedings of the International Conference on Formal Ontology in Information Systems, Ogunquit, Maine, USA, Oct. 17-19, 2001, 34-46.
Duarte et al., "Towards an Ontology of Requirements at Runtime," Formal Ontology in Information Systems, Jan. 2016, 283:255-268.
El Saddik, "Digital Twins: The Convergence of Multimedia Technologies," IEEE MultiMedia, Apr.-Jun. 2018, 25(2):87-92.
Fielder et al., "Decision support approaches for cyber security investment," Decision Support Systems, Jun. 2016, 86:13-23.
Foundations of Databases, 1st ed., Abiteboul et al. (eds.), 1995, Chapter 12, 38 pages.
Fundamentals of Business Process Management, 2nd ed., Dumas et al. (eds.), 2018, 546 pages.
Gailly et al., "Ontological Reengineering of the REA-EO using UFO," Presented at Proceedings of the International Workshop on Ontology-Driven Software Engineering, Orlando, FL, USA, Oct. 2009, 15 pages.
Gandomi et al., "Beyond the hype: Big data concepts, methods, and analytics," International Journal of Information Management, Apr. 2015, 35(2):137-144.
GE.com [online], "Predix Platform," available on or before Nov. 16, 2018 via Internet Archive: Wayback Machine URL<https://web.archive.org/web/20181116005032/https://www.ge.com/digital/iiot-platform>, retrieved on Jul. 9, 2021, retrieved from URL<https://www.ge.com/digital/iiot-platform>, 6 pages.
Genovese, "Data mesh: the newest paradigm shift for a distributed architecture in the data world and its application," Thesis for the degree of Computer Engineering, Politecnico di Torino, 2021, 76 pages.
Gergeleit et al., "Modeling Security Requirements and Controls for an Automated Deployment of Industrial IT Systems," Kommunikation und Bildverarbeitung in der Automation. Technologien für die intelligente Automation (Technologies for Intelligent Automation), Jan. 14, 2020, 12:217-231.
GitHub.com [online], "ALFA-group/BRON," available on or before Nov. 23, 2021 via Internet Archive: Wayback Machine URL<https://web.archive.org/web/20211123023700/https://github.com/ALFA-group/BRON>, retrieved on Oct. 4, 2022, retrieved from URL<https://github.com/ALFA-group/BRON>, 5 pages.
Giunchiglia et al., "Lightweight Ontologies," Technical Report DIT-07-071, University of Trento, Oct. 2007, 10 pages.
Gomez-Perez et al., "Ontology languages for the Semantic Web," IEEE Intelligent Systems, Feb. 2002, 17(1):54-60.
Grieves, "Virtually Intelligent Product Systems: Digital and Physical Twins", Complex Systems Engineering: Theory and Practice, Jul. 2019, 256:175-200.
Grigorescu et al., "CVE2ATT&CK: BERT-Based Mapping of CVEs to MITRE ATT&CK Techniques," Algorithms, Aug. 31, 2022, 15(9):314, 22 pages.
Guarino, "Formal Ontology in Information Systems," Presented at Proceedings of the 1st International Conference, Trento, Italy, Jun. 6-8, 1998, 3-15.
Guizzardi et al., "An Ontology-Based Approach for Evaluating the Domain Appropriateness and Comprehensibility Appropriateness of Modeling Languages," MoDELS, 2005, 691-705.
Guizzardi, "On Ontology, ontologies, Conceptualizations, Modeling Languages, and (Meta)Models," Presented at Proceedings of the 2007 conference on Databases and Information Systems IV: Selected Papers from the Seventh International Baltic Conference, Amsterdam, Netherlands, Jun. 5, 2007, 18 pages.
Guizzardi, "Ontological Foundations for Structural Conceptual Models," Thesis for the degree of Doctor, University of Twente, 2005, 441 pages.
Guizzardi, "Ontology, Ontologies and the 'I' of FAIR," Data Intelligence, Jan. 1, 2020, 2(1-2):181-191.
Guizzardi, "The role of foundational ontology for conceptual modeling and domain ontology representation," Presented at Proceedings of the 7th International Baltic Conference on Databases and Information Systems, Vilnius, Lithuania, Jul. 3-6, 2006, 9 pages.
Hadar et al., "Big Data Analytics on Cyber Attack Graphs for Prioritizing Agile Security Requirements", Proceedings of the 2019 IEEE 27th International Requirements Engineering Conference, Sep. 23-27, 2019, Jeju Island, Kora, 330-339.
Hadar et al., "Cyber Digital Twin Simulator for Automatic Gathering and Prioritization of Security Controls Requirements," Proceedings of the 2020 IEEE 28th International Requirements Engineering Conference, Aug. 31-Sep. 4, 2020, Zurich, Switzerland, 250-259.
Hansen et al., "Model-in-the-Loop and Software-in-the-Loop Testing of Closed-Loop Automotive Software with Arttest," Informatik, 2017, 13 pages.
Hasan et al., "Towards Optimal Cyber Defense Remediation in Energy Delivery Systems", Proceedings of 2019 IEEE Global Communications Conference, Dec. 9-13, 2019, Waikoloa, Hawaii, 7 pages.
Hassani et al., "Artificial Intelligence (AI) or Intelligence Augmentation (IA): What is the Future?," AI, Apr. 12, 2020, 1(2):143-155.
Hemberg et al., "BRON—Linking Attack Tactics, Techniques, and Patterns with Defensive Weaknesses, Vulnerabilities and Affected Platform Configurations," arXiv, Oct. 1, 2020, arXiv:2010.00533v1, 14 pages.
Hemberg et al., "Using a Collated Cybersecurity Dataset for Machine Learning and Artificial Intelligence," arXiv, Aug. 5, 2021, arXiv:2108.02618v1, 5 pages.
Herre, "General Formal Ontology (GFO): A Foundational Ontology for Conceptual Modelling," Theory and Applications of Ontology: Computer Applications, Aug. 12, 2010, 297-345.
Hofner et al., "Dijkstra, Floyd and Warshall meet Kleene," Formal Aspects of Computing, Jul. 2012, 24(4-6):459-476.
Horrocks et al., "SWRL: A Semantic Web Rule Language Combining OWL and RuleML," W3C Member Submission, May 21, 2004, 24 pages.
Husák et al., "Survey of Attack Projection, Prediction, and Forecasting in Cyber Security," IEEE Communications Surveys & Tutorials, Sep. 24, 2018, 21(1):640-660.
Idika et al., "Extending attack graph-based security metrics and aggregating their application," IEEE Transactions on Dependable and Secure Computing, Jan./Feb. 2012, 9(1):75-85.
IEEE, "IEEE Standard for extensible Event Stream (XES) for Achieving Interoperability in Event Logs and Event Stream," IEEE Std 1849™-2016, Sep. 22, 2016, 50 pages.
IEEE.org [online], "This Car Runs on Code," Feb. 1, 2009, retrieved on Jul. 9, 2021, retrieved from URL<https://spectrum.ieee.org/transportation/systems/this-car-runs-on-code>, 5 pages.
Ingols et al., "Practical Attack Graph Generation for Network Defense," 2006 22nd Annual Computer Security Applications Conference (ACSAC'06), Miami Beach, Florida, Dec. 11-15, 2006, 10 pages.
International Organization for Standardization, "International Standard: ISO/IEC 27001," ISO/IEC 27001:2013(E), Oct. 1, 2013, 29 pages.
Jacobsen et al., "FAIR Principles: Interpretations and Implementation Considerations," Data Intelligence, Jan. 1, 2020, 2(1-2):10-29.
Joint Task Force Transformation Initiative, "Security and Privacy Controls for Federal Information Systems and Organizations," National Institute of Standards and Technology Special Publication 800-53, Revision 4, Jan. 22, 2015, 462 pages.
Kaloroumakis et al., "Toward a Knowledge Graph of Cybersecurity Countermeasures," Technical Report, The MITRE Corporation, 2021, 11 pages.
Khouzani et al., "Scalable min-max multi-objective cyber-security optimization over probabilistic attack graphs", European Journal of Operational Research, Nov. 1, 2019, 278(3):894-903.
Li et al., "Cluster security research involving the modeling of network exploitations using exploitation graphs," Proceedings of the IEEE International Symposium on Cluster Computing and the Grid, Singapore, May 16-19, 2006, 11 pages.
Lippmann et al., "Validating and restoring defense in depth using attack graphs," Proceedings of the Military Communications Conference, Washington, DC, USA, Oct. 23-25, 2006, 10 pages.

(56) References Cited

OTHER PUBLICATIONS

Lu et al., "Ranking attack graphs with graph neural networks," Proceedings of the 5th International Conference on Information Security Practice and Experience, Xi'an, China, Apr. 13-15, 2009; Lecture Notes in Computer Science, Apr. 2009, 5451:345-359.

Machado et al., "Data Mesh: Concepts and Principles of a Paradigm Shift in Data Architectures," Procedia Computer Science, 2022, 196:263-271.

Machado et al., "Data-Driven Information Systems: The Data Mesh Paradigm Shift," Presented at Proceedings of the 29th International Conference on Information Systems Development, Valencia, Spain, Sep. 8-10, 2021, 6 pages.

Makridakis, "The forthcoming artificial intelligence (ai) revolution: Its impact on society and firms," Futures, Jun. 2017, 90:46-60.

Manning Free Content Center [online], "Building Your Vocabulary," dated May 19, 2017, retrieved on Jun. 3, 2020, retrieved from URL <https://freecontent.manning.com/building-your-vocabulary/>, 10 pages.

Martins et al., "A framework for conceptual characterization of ontologies and its application in the cybersecurity domain," Software and Systems Modeling, Jul. 2, 2022, 21:1437-1464.

Martins et al., "Conceptual Characterization of Cybersecurity Ontologies," The Practice of Enterprise Modelling, Nov. 18, 2020, 323-338.

MaschinenMarkt.international [online], "Digital twin in the automobile industry," Aug. 1, 2019, retrieved on Jul. 9, 2021, retrieved from URL<https://www.maschinenmarkt.international/digital-twin-in-the-automobile-industry-a-851549/>, 3 pages.

Mashable.com [online], "Ford ready to innovate, but not at the expense of customer needs," May 31, 2016, retrieved on Jul. 9, 2021, retrieved from URL<https://mashable.com/article/mark-fields-ford-codecon>, 7 pages.

Mathis, "Data lakes," Datenbank-Spektrum, Oct. 6, 2017, 17(3):289-293.

Mehta et al., "Ranking attack graphs," Proceedings of the International Conference on Recent Advances in Intrusion Detection, Hamburg, Germany, Sep. 20-22, 2006; Lecture Notes in Computer Science, Sep. 2006, 4219:127-144.

Mitre.org [online], "CAPEC: Common Attack Pattern Enumerations and Classifications," available on or before Jul. 21, 2007 via Internet Archive: Wayback Machine URL<https://web.archive.org/web/20070721234158/https://capec.mitre.org/>, retrieved on Oct. 4, 2022, retrieved from URL<https://capec.mitre.org/>, 2 pages.

Mitre.org [online], "CWE: Common Weakness Enumeration," available on or before Oct. 9, 2006 via Internet Archive: Wayback Machine URL<https://web.archive.org/web/20061009060144/https://cwe.mitre.org/>, retrieved on Oct. 4, 2022, retrieved from URL<https://cwe.mitre.org/>, 1 page.

MITRE.org [online], "D3FEND," available on or before Jun. 22, 2021 via Internet Archive: Wayback Machine URL<https://web.archive.org/web/20210622142005/https://d3fend.mitre.org/>, retrieved on Jul. 13, 2022, retrieved from URL<https://d3fend.mitre.org/>, 3 pages.

MITRE.org [online], "Digital Artifact Ontology," available on or before Jun. 25, 2021 via Internet Archive: Wayback Machine URL<https://web.archive.org/web/20210625024718/https://d3fend.mitre.org/dao>, retrieved on Jul. 13, 2022, retrieved from URL<https://d3fend.mitre.org/dao/>, 3 pages.

MITRE.org [online], "Service Application," available on or before Jun. 25, 2021 via Internet Archive: Wayback Machine URL<https://web.archive.org/web/20210625024952/https://d3fend.mitre.org/dao/artifact/d3f:ServiceApplication/>, retrieved on Jul. 13, 2022, retrieved from URL<https://d3fend.mitre.org/dao/artifact/d3f:ServiceApplication/>, 1 page.

Monino, "Data Value, Big Data Analytics, and Decision-Making," Journal of the Knowledge Economy, Aug. 20, 2016, 256-267.

Murata, "Petri Nets: Properties, Analysis and Applications," Proceedings of the IEEE, Apr. 1989, 77(4):541-580.

Narmeen Zakaria Bawany; DDoS Attack Detection and Mitigation Using SON: Methods, Practices, and Solutions; SPRINGER-2017; p. 425-441.

National Institute of Standards and Technology [online], "National Vulnerability Database," last updated Jun. 2, 2020, retrieved on Jun. 3, 2020, retrieved from URL<https://nvd.nist.gov/>, 4 pages.

Neo4j.com [online], "Random Walk," available on or before Aug. 6, 2020 via Internet Archive: Wayback Machine URL<https://web.archive.org/web/20200806193136/https://neo4j.com/docs/graph-data-science/current/alpha-algorithms/random-walk/>, retrieved on Jul. 28, 2021, retrieved from URL<https://neo4j.com/docs/graph-data-science/current/alpha-algorithms/random-walk/>, 7 pages.

Neo4j.com [online], "Topological link prediction," available on or before May 17, 2020, via Internet Archive: Wayback Machine URL<https://web.archive.org/web/20200517111258/https://neo4j.com/docs/graph-data-science/current/algorithms/linkprediction/>, retrieved on Jun. 14, 2022, retrieved from URL<https://neo4j.com/docs/graph-data-science/current/algorithms/linkprediction/>, 2 pages.

Neo4j.com [online], "Yen's K-Shortest Paths," available on or before Aug. 6, 2020 via Internet Archive: Wayback Machine URL<https://web.archive.org/web/20200806185626/https://neo4j.com/docs/graph-data-science/current/alpha-algorithms/yen-s-k-shortest-path/, retrieved on Jul. 28, 2021, retrieved from URL<https://web.archive.org/web/20200806185626/https://neo4j.com/docs/graph-data-science/current/alpha-algorithms/yen-s-k-shortest-path/>, 5 pages.

Networks: An Introduction, Newman (ed.), May 2010, 789 pages.

Noel et al., "CyGraph: Graph-Based Analytics and Visualization for Cybersecurity," Handbook of Statistics, Jan. 2016, 35:117-167.

Ortalo et al., "Experimenting with quantitative evaluation tools for monitoring operational security," IEEE Transactions on Software Engineering, Sep./Oct. 1999, 25(5):633-650.

Ou et al., "A Scalable Approach to Attack Graph Generation," Proceedings of the 13th ACM Conference on Computer and Communication Security, Oct. 2006, 336-345.

Ou et al., "MulVAL: A Logic-based Network Security Analyzer," 14th USENIX Security Symposium, Aug. 2005, Baltimore, MD, USA, 16 pages.

Phillips et al., "A graph-based system for network-vulnerability analysis," Proceedings of the 1998 Workshop on New Security Paradigms, Charlottesville, Virginia, Sep. 22-26, 1998, 71-79.

PM4Py.de [online], "DFG: Process Discovery using Directly-Follows Graphs," available on or before Mar. 7, 2019 via Internet Archive: Wayback Machine URL<https://web.archive.org/web/20190307062454/http://pm4py.pads.rwth-aachen.de/documentation/process-discovery/dfg/>, retrieved on Jul. 28, 2021, retrieved from URL<https://web.archive.org/web/20190307062454/http://pm4py.pads.rwth-aachen.de/documentation/process-discovery/dfg/>, 4 pages.

PM4Py.de [online], "Process Discovery," available on or before Jun. 26, 2020 via Internet Archive: Wayback Machine URL<https://web.archive.org/web/20200626094921/https://pm4py.fit.fraunhofer.de/documentation#discovery>, retrieved on Jul. 28, 2021, retrieved from URL<https://pm4py.fit.fraunhofer.de/documentation#discovery>, 5 pages.

Process Mining, 1st ed., van der Aalst, 2011, Chapters 5-6, 63 pages.

Purvine et al., "A Graph-Based Impact Metric for Mitigating Latheral Movement Cyber Attacks", Automated Descision Making for Active Cyber Defence, Oct. 2016, pp. 45-52.

Q. Liu et al., "Latte: Large-Scale Lateral Movement Detection," MILCOM 2018—2018 IEEE Military Communications Conference (MILCOM), 2018, pp. 1-6, doi: 10.1109/MILCOM.2018.8599748. (Year: 2018).

Rossi et al., "Knowledge Graph Embedding for Link Prediction: A Comparative Analysis," arXiv, Feb. 3, 2020, arXiv:2002.00819v1, 42 pages.

Sales et al., "Ontological anti-patterns in taxonomic structures," Presented at Proceedings of ONTOBRAS 2019: XII Seminar on Ontology Research in Brazil, Porto Alegre, Brazil, Sep. 2-5, 2019, 13 pages.

Schatz et al., "Economic valuation for information security investment: a systematic literature review," Information Systems Frontiers, Apr. 18, 2016, 19:1205-1228.

(56) References Cited

OTHER PUBLICATIONS

Shandilya et al., "Use of Attack Graphs in Security Systems", Hindawi Journal of Computer Networks and Communications, Oct. 20, 2014, 2014:818957, 14 pages.

Shi et al., "Normalized Cuts and Image Segmentation," IEEE Transactions on Pattern Analysis and Machine Intelligence, Aug. 2000, 22(8):888-905.

Siemens.com [online], "From vehicle design to multi-physical simulations," available on or before Jul. 26, 2019 via Internet Archive: Wayback Machine URL<https://web.archive.org/web/20190726044643/https://new.siemens.com/global/en/markets/automotive-manufacturing/digital-twin-product.html>, retrieved on Jul. 9, 2021, retrieved from URL<https://new.siemens.com/global/en/markets/automotive-manufacturing/digital-twin-product.html>, 11 pages.

Sitton-Candanedo et al., "A review of edge computing reference architectures and a new global edge proposal," Future Generation Computer Systems, Oct. 2019, 99:278-294.

SMMT.co.uk [online], "Role of Digital Twin in Automotive Industry," Dec. 17, 2018, retrieved on Jul. 9, 2021, retrieved from URL<https://www.smmt.co.uk/2018/12/role-of-digital-twin-in-automotive-industry/>, 9 pages.

Sourceforge.net [online], "XSB," last updated Oct. 29, 2017, retrieved on Jun. 3, 2020, retrieved from URL <http://xsb.sourceforge.net/>, 2 pages.

Stanek et al., "Method of comparing graph differencing algorithms for software differencing," 2008 IEEE International Conference on Electro/Information Technology, Ames, Iowa, May 18-20, 2008, 482-487.

Strom et al., "MITRE ATT&CK™: Design and Philosophy", The MITRE Corporation, Jul. 2018, 37 pages.

Swiler et al., "A graph-based network-vulnerability analysis system," Sandia National Laboratories, 1997, Tech. Rep. SAND97-3010/1, 25 pages.

Tan et al., "Future internet: The Internet of Things," Presented at Proceedings of the 2010 3rd International Conference on Advanced Computer Theory and Engineering (ICACTE), Chengdu, China, Aug. 20-22, 2010.

TechCrunch.com [online], "Tesla is rolling out its Navigate on Autopilot feature," Oct. 27, 2018, retrieved on Jul. 9, 2021, retrieved from URL<https://techcrunch.com/2018/10/26/tesla-is-rolling-out-its-navigate-on-autopilot-feature/>, 17 pages.

The Fourth Industrial Revolution, 1st. ed., Schwab, Jan. 2017, 218 pages.

The MITRE Corporation [online], "MITRE ATT&CK," last updated May 27, 2020, retrieved on Jun. 3, 2020, retrieved from URL <https://attack.mitre.org/>, 3 pages.

Ullah et al., "Towards Modeling Attacker's Opportunity for Improving Cyber Resilience in Energy Delivery Systems", Resilience Week, Aug. 2018, pp. 100-107.

Uschold et al., "Ontologies: Principles, methods and applications," The Knowledge Engineering Review, Jan. 1996, 11(2):93-136.

Van Der Aalst et al., "Causal Nets: A Modeling Language Tailored towards Process Discovery," Presented at Proceedings of CONCUR 2011—Concurrency Theory, Aachen, Germany, Sep. 6-9, 2011; Lecture Notes in Computer Science, Sep. 2011, 6901:28-42.

Van Heijst et al., "Using explicit ontologies in KBS development," International Journal of Human-Computer Studies, Feb. 1997, 46(2-3):183-292.

Vehicle Power Management, 1st ed., Zhang et al.(eds.), Aug. 2011, Chapter 10, 27 pages.

W3.org [online], "Swrl: A Semantic Web Rule Language Combining OWL and RuleML," May 21, 2004, retrieved on Oct. 4, 2022, retrieved from URL<https://www.w3.org/Submission/SWRL/>, 24 pages.

Wand et al., "On the deep structure of information systems," Information Systems Journal, Jul. 1995, 5(3):203-223.

Wang et al., "A Network Vulnerability Assessment Method Based on Attack Graph," 2018 IEEE 4th International Conference on Computer and Communications, Dec. 7-10, 2018, Chengdu, China, 1149-1154.

Wang et al., "Big data analytics in cyber security: network traffic and attacks," Journal of Computer Information Systems, Jan. 2020, 61(3):1-8.

Wang et al., "Exploring Attack Graph for Cost-benefit Security Hardening: A Probabilistic Approach," Computers & Security, Feb. 2013, 32:158-169.

Ward et al., "Threat Analysis and Risk Assessment in Automotive Cyber Security," SAE Int. J. Passeng. Cars Electron. Electr. Systems, May 2013, 6(2):507-513.

Wikipedia.org [online], "5G," last updated Jul. 9, 2021, retrieved on Jul. 9, 2021, retrieved from URL<https://en.wikipedia.org/wiki/5G>, 29 pages.

Wikipedia.org [online], "Active Directory," last updated Jun. 1, 2020, retrieved on Jun. 3, 2020, retrieved from URL <https://en.wikipedia.org/wiki/Active_Directory>, 14 pages.

Wikipedia.org [online], "Backward Chaining," last updated Nov. 16, 2019, retrieved on Jun. 3, 2020, retrieved from URL <https://en.wikipedia.org/wiki/Backward_chaining>, 3 pages.

Wikipedia.org [online], "Breadth-first search," last updated Jul. 21, 2021, retrieved on Jul. 28, 2021, retrieved from URL<https://en.wikipedia.org/wiki/Breadth-first_search>, 6 pages.

Wikipedia.org [online], "Cartesian Product," last updated Feb. 28, 2020, retrieved on Jun. 3, 2020, retrieved from URL <https://en.wikipedia.org/wiki/Cartesian_product>, 9 pages.

Wikipedia.org [online], "Centrality," last updated May 29, 2020, retrieved on Jun. 3, 2020, retrieved from URL <https://en.wikipedia.org/wiki/Centrality>, 15 pages.

Wikipedia.org [online], "Centrality," last updated Oct. 18, 2020, retrieved on Oct. 26, 2020, retrieved from URL<https://en.wikipedia.org/wiki/Centrality>, 15 pages.

Wikipedia.org [online], "Common Vulnerabilities and Exposures," last updated Jul. 6, 2021, retrieved on Jul. 9, 2021, retrieved from URL<https://en.wikipedia.org/wiki/Common_Vulnerabilities_and_Exposures>, 5 pages.

Wikipedia.org [online], "Common Vulnerability Scoring System," last updated Jun. 21, 2021, retrieved on Jul. 9, 2021, retrieved from URL<https://en.wikipedia.org/wiki/Common_Vulnerability_Scoring_System>, 7 pages.

Wikipedia.org [online], "Depth-first search," last updated Jun. 16, 2021, retrieved on Jul. 28, 2021, retrieved from URL<https://en.wikipedia.org/wiki/Depth-first_search>, 8 pages.

Wikipedia.org [online], "Digital twin," last updated Jul. 8, 2021, retrieved on Jul. 9, 2021, retrieved from URL<https://en.wikipedia.org/wiki/Digital_twin>, 13 pages.

Wikipedia.org [online], "Eigenvector centrality," last updated Dec. 1, 2020 retrieved on Jan. 11, 2021, retrieved from URL<https://en.wikipedia.org/wiki/Eigenvector_centrality>, 4 pages.

Wikipedia.org [online], "Flood Fill," last updated Dec. 24, 2019, retrieved on Jun. 3, 2020, retrieved from URL <https://en.wikipedia.org/wiki/Flood_fill>, 7 pages.

Wikipedia.org [online], "Floyd-Warshall algorithm," last updated Jan. 5, 2021, retrieved on Jan. 11, 2021, retrieved from URL<https://en.wikipedia.org/wiki/Floyd%E2%80%93Warshall_algorithm>, 7 pages.

Wikipedia.org [online], "Forward Chaining," last updated Nov. 18, 2019, retrieved on Jun. 3, 2020, retrieved from URL <https://en.wikipedia.org/wiki/Forward_chaining>, 3 pages.

Wikipedia.org [online], "Look-ahead (backtracking)," last updated May 23, 2020, retrieved on Jun. 3, 2020, retrieved from URL <https://en.wikipedia.org/wiki/Look-ahead_(backtracking)>, 3 pages.

Wikipedia.org [online], "Natural language processing," last updated Jun. 10, 2022, retrieved on Jun. 14, 2022, retrieved from URL<https://en.wikipedia.org/wiki/Natural_language_processing>, 13 pages.

Wikipedia.org [online], "Reachability," last updated Oct. 22, 2021, retrieved on Jul. 13, 2022, retrieved from URL<https://en.wikipedia.org/wiki/Reachability>, 5 pages.

Wikipedia.org [online], "SCADA," last updated Jun. 2, 2020, retrieved on Jun. 3, 2020, retrieved from URL <https://en.wikipedia.org/wiki/SCADA>, 12 pages.

(56) References Cited

OTHER PUBLICATIONS

Wikipedia.org [online], "Sigmoid function," last updated Dec. 25, 2020, retrieved on Jan. 11, 2021, retrieved from URL<https://en.wikipedia.org/wiki/Sigmoid_function>, 4 pages.

Wikipedia.org [online], "SWOT analysis," last updated Oct. 20, 2020, retrieved on Oct. 26, 2020, retrieved from URL<https://en.wikipedia.org/wiki/SWOT_analysis>, 8 pages.

Wikipedia.org [online], "Traffic congestion," last updated Oct. 5, 2020, retrieved on Oct. 26, 2020, retrieved from URL<https://en.wikipedia.org/wiki/Traffic_congestion>, 24 pages.

Wikipedia.org [online], "Traffic flow," last updated Oct. 19, 2020, retrieved on Oct. 26, 2020, retrieved from URL<https://en.wikipedia.org/wiki/Traffic_flow>, 41 pages.

Wikipedia.org [online], "Zero-day (computing)," last updated Oct. 16, 2020, retrieved on Oct. 26, 2020, retrieved from URL<https://en.wikipedia.org/wiki/Zero-day (computing)>, 8 pages.

Wu et al., "A service-oriented architecture for business intelligence," Presented at Proceedings of the IEEE International Conference on Service-Oriented Computing and Applications (SOCA '07), Newport Beach, CA, USA, Jun. 19-20, 2007, 279-285.

X. Li, C. Zhang, T. Jung, J. Qian and L. Chen, "Graph-based privacy-preserving data publication," IEEE Infocom 2016—The 35th Annual IEEE International Conference on Computer Communications, 2016, pp. 1-9, doi: 10.1109/INF000M.2016.7524584. (Year: 2016).

Xie et al., "Using Bayesian Networks for Cyber Security Analysis," Proceedings of the 2010 IEEE/IFIP International Conference on Dependable Systems & Networks, Jun. 28-Jul. 1, 2010, Chicago, Illinois, 211-220.

Yi et al., "Overview on attack graph generation and visualization technology," 2013 International Conference on Anti-Counterfeiting, Security and Identification (ASID), Shanghai, China, Oct. 25-27, 2013, 6 pages.

You et al., "A Review of Cyber Security Controls from an ICS Perspective," Proceedings of 2018 International Conference on Platform Technology and Service (PlatCon), Jan. 29-31, 2018, Jeju, South Korea, 5 pages.

Zeng et al., "Survey of Attack Graph Analysis Methods from the Perspective of Data and Knowledge Processing," Hindawi Security and Communication Networks, Dec. 26, 2019, 2019:2031063, 17 pages.

Zhang et al., "Co-simulation framework for design of time-triggered cyber physical systems," 2013 ACM/IEEE International Conference on Cyber-Physical Systems (ICCPS), Philadelphia, Pennsylvania, Apr. 8-11, 2013, 119-128.

Zhang et al., "Optimal Decision-Making Approach for Cyber Security Defense Using Game Theory and Intelligent Learning," Security and Communication Networks, Dec. 23, 2019, 2019:3038586, 17 pages.

Zhao et al., "Attack graph analysis method for large scale network security hardening," J. Front. Comput. Sci. Technology, 2018, 12(2):263-273 (with English Abstract).

* cited by examiner

| Source ElementAtRisk | Destination ElementAtRisk | Relation | Source risk vector | Importance vector |
|---|---|---|---|---|
| LeakProjectFile (CyberImpact) | 192.168.250.210 (CyberAsset) | CorrelatedTo (Abstraction) | {"Confidentiality":0.53, "Integrity":0, "Availability":0, "Safety":0} | {"Confidentiality":1, "Integrity":1, "Availability":1, "Safety":1} |
| 192.168.250.210 (CyberAsset) | Door Disassembly (ProcessElement) | CorrelatedTo (Abstraction) | NA | {"Confidentiality":1, "Integrity":1, "Availability":1, "Safety":1} |
| Door Disassembly (ProcessElement) | Dashboard Installation (ProcessElement) | FollowedBy (Dependency) | NA | {"Confidentiality":1, "Integrity":1, "Availability":1, "Safety":1} |
| Door Disassembly (ProcessElement) | Vehicle Assembly (ProcessElement) | ComponentOf (Abstraction) | NA | {"Confidentiality":1, "Integrity":1, "Availability":1, "Safety":1} |
| Dashboard Installation (ProcessElement) | Vehicle Assembly (ProcessElement) | ComponentOf (Abstraction) | NA | {"Confidentiality":1, "Integrity":1, "Availability":1, "Safety":1} |

| Process Element | Process Level Risk | Cyber Asset | Cyber Asset Level Risk | Cyber Impact* Level Risk |
|---|---|---|---|---|
| Door Disassembly | $\overline{DR} = [0.53,0.83,0.33,0.84]$<br>$\overline{IDR} = [0.00,0.00,0.00,0.00]$<br>$\overline{TR} = [0.53,0.83,0.33,0.84]$ | 192.168.250.210 | $\overline{DR} = [0.53,0.83,0.33,0.84]$ | $\overline{DR_A} = [0.16,0.58,\mathbf{0.33,0.84}]$<br>$\overline{DR_B} = [0.00,0.18,0.00,0.09]$<br>$\overline{DR_C} = [0.00,\mathbf{0.83},0.00,0.00]$<br>$\overline{DR_D} = [\mathbf{0.53},0.00,0.00,0.00]$<br>$\overline{DR_E} = [0.00,0.27,0.09,0.27]$<br>$\overline{DR_F} = [0.00,0.26,0.17,0.17]$<br>$\overline{DR_G} = [0.00,0.53,0.00,0.08]$<br>$\overline{DR_H} = [0.00,0.26,0.08,0.08]$<br>$\overline{DR_I} = [0.00,0.26,0.08,0.52]$<br>$\overline{DR_J} = [0.00,0.25,0.17,0.34]$ |
| | | 192.168.250.108 | $\overline{DR} = [0.00,0.00,0.00,0.00]$ | N/A |
| Dashboard Installation | $\overline{DR} = [0.00,0.00,0.00,0.00]$<br>$\overline{IDR} = [0.53,0.83,0.33,0.84]$<br>$\overline{TR} = [0.53,0.83,0.33,0.84]$ | 192.168.250.3 | $\overline{DR} = [0.00,0.00,0.00,0.00]$ | N/A |

*FIG. 6C*

ONTOLOGY-BASED RISK PROPAGATION OVER DIGITAL TWINS

CROSS-REFERENCE TO RELATED APPLICATIONS

This application claims priority to Polish App. No. P.440887 filed on Apr. 8, 2022, the disclosure of which is expressly incorporated herein by reference in the entirety.

FIELD

This specification relates to systems for evaluating and mitigating risks in enterprise networks.

BACKGROUND

Networks, such as computer networks, are susceptible to attack by malicious users (e.g., hackers) and other adverse impacts. For example, hackers can infiltrate computer networks in an effort to obtain sensitive information (e.g., user credentials, payment information, address information, social security numbers) and/or to take over control of one or more systems. Computer networks are used to execute processes that support operations of enterprises and/or industrial infrastructures. Enterprises, in general, and industrial infrastructures, in particular, are increasingly connected to external networks such as the Internet. As such, processes that were once isolated from the open Internet network, are now vulnerable to external cyber-attacks. As the frequency and derived impact of these attacks increase, there is a need to prioritize and mitigate risks in order of importance to the operations.

To defend against such attacks, enterprises use security systems to monitor occurrences of potentially adverse events occurring within a network, and alert security personnel to such occurrences. For example, one or more dashboards can be provided, which provide lists of alerts that are to be addressed by the security personnel.

In an effort to defend against attacks, so-called knowledge graphs can be generated, which represent relationships between assets and processes within networks. A knowledge graph can be used to understand how a computer network can be hacked and undesirable consequences that can result. Accordingly, knowledge graphs can be described as an important tool in developing anti-hacker defenses. For example, a knowledge graph can be used to identify the most vulnerable components within a computer network, and can be used to evaluate fixes of vulnerabilities that the knowledge graph reveals (e.g., by fixing a limited number of issues, any adversary attack on the computer network, or on certain components in the computer network can be stopped).

SUMMARY

Implementations of the present disclosure are directed to mitigating risk in enterprise networks. More particularly, implementations of the present disclosure are directed to executing risk propagation analytics over a digital twin in a domain-agnostic manner.

In some examples, implementations of the present disclosure are provided as a process for evaluating risk propagation of networks using a digital twin. A digital twin is a digital representation of a physical object, process, or service. The disclosed techniques can be implemented to enable computation and execution of risk analytics over digital twins represented by a knowledge graph in a domain-agnostic manner and in a way that enables identifying root causes of risk. An example system executes risk propagation analytics in a generic manner, regardless of the specific digital twin's ontological and data domain. For instance, in a cyber domain, there is a need to propagate risk from cyber impacts through cyber assets to processes. In a production domain, there is a need to propagate risk from activities through sub processes to parent processes. Furthermore, each domain may have different relevant risk aspects. For instance, in the cyber domain, an attacker could trigger an impact over asset's confidentiality. In the production domain, a problem with an asset or process could impact the quality of the resulting product.

In some implementations, actions include: obtaining knowledge graph data defining a knowledge graph including nodes and edges between the nodes, the nodes including asset nodes representing assets and process nodes representing processes; each edge representing a relation between nodes; determining, from the knowledge graph, an aggregated risk for a first process represented by a first process node, including: identifying, for the first process node, a set of incoming nodes, each incoming node comprising an asset node or a process node and being connected to the first process node by a respective edge; determining a direct risk for the first process based on relations between the first process node and asset nodes of the set of incoming nodes; and determining an indirect risk for the first process based on relations between the first process node and process nodes of the set of incoming nodes; and generating, based on the aggregated risk for the first process node, a mitigation recommendation including one or more actions for reducing the aggregated risk for the first process node.

Other implementations of this aspect include corresponding systems, apparatus, and computer programs, configured to perform the actions of the methods, encoded on computer storage devices.

These and other implementations can each optionally include one or more of the following features: determining the direct risk for the first process node based on relations between the first process node and asset nodes of the set of incoming nodes comprises: identifying an edge representing a relation between the first process node and a first asset node, the edge being associated with an importance value representing an amount of risk propagated from the first asset node to the first process node; and determining the direct risk for the first process node by multiplying the importance value by a risk associated with the first asset node; determining the indirect risk for the first process based on relations between the first process node and process nodes of the set of incoming nodes comprises: identifying an edge representing a relation between the first process node and a second process node, the edge being associated with an importance value representing an amount of risk propagated from the second process node to the first process node; and determining the indirect risk for the first process node by multiplying the importance value by a risk associated with the second process node; the direct risk for the first process is represented by a direct risk vector including multiple risk values each risk value being associated with a different aspect of risk; aspects of risk include availability risk, confidentiality risk, integrity risk, and safety risk; the indirect risk for the first process is represented by an indirect risk vector including multiple risk values, each risk value being associated with the different aspect of risk; the aggregated risk for the first process is represented by an aggregated risk vector including multiple risk values, each risk value being associated with the different aspect of risk; determining the aggregated risk for the first process comprises generating the aggregated risk vector, including selecting, for each of the different aspects of risk, the maximum risk value between the direct risk vector and indirect risk vector; each edge is associated with an importance vector representing an amount of risk propagated between nodes connected by the edge; the actions include: obtaining generic ontology data representing classes, properties, and relations for multiple use cases; generating, from the generic ontology data, domain-specific ontology data representing classes, properties, and relations for a particular use case; and generating the knowledge graph by mapping the generic ontology data to the domain-specific ontology data; each edge represents a hierarchy relation, an abstraction relation, or a process dependency relation; a process dependency relation represents risk propagation through a workflow including multiple processes; a hierarchy relation represents risk propagation from an asset to a process that is correlated with the asset; an abstraction relation represents risk propagation from an asset to a process at a higher level of abstraction; the actions include automatically executing at least one of the one or more actions included in the mitigation recommendation; the actions include presenting, through a user interface, a graphical representation of the knowledge graph and an indication of the mitigation recommendation.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 6B shows an example of a data extraction output from a knowledge graph.

FIG. 6C shows an example of risk propagation output from a knowledge graph.

Like reference symbols in the various drawings indicate like elements.

DETAILED DESCRIPTION

Figure 1:
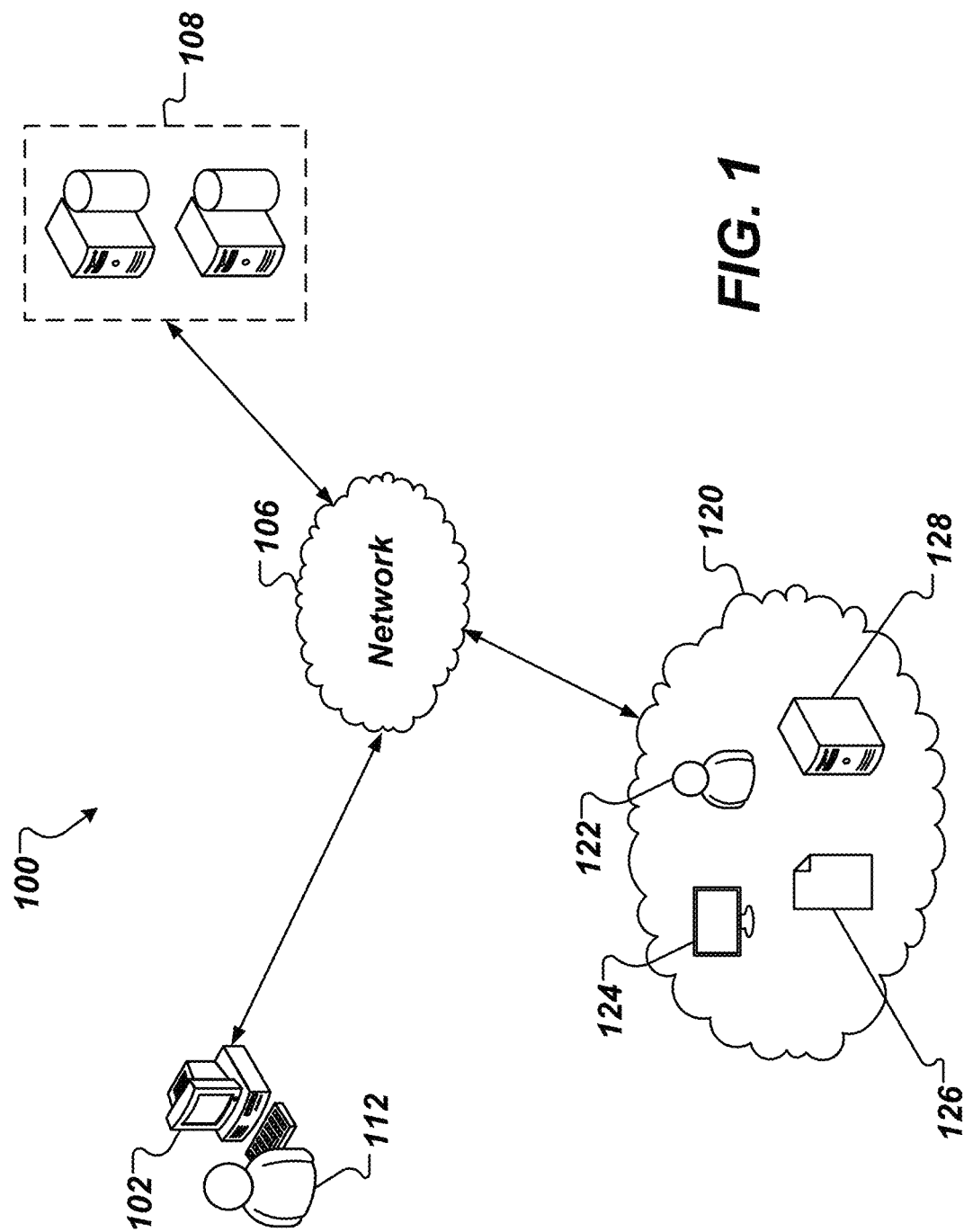
FIG. 1 depicts an example architecture that can be used to execute implementations of the present disclosure.

Implementations of the present disclosure are directed to mitigating risk in enterprise networks. More particularly, implementations of the present disclosure are directed to executing risk propagation analytics over a digital twin in a domain-agnostic manner.

In some examples, implementations of the present disclosure are provided as a process for evaluating risk propagation of networks using a digital twin. A digital twin is a digital representation of a physical object, process, or service. The disclosed techniques can be implemented to enable computation and execution of risk analytics over digital twins represented by a knowledge graph in a domain-agnostic manner and in a way that enables identifying root causes of risk. An example system executes risk propagation analytics in a generic manner, regardless of the specific digital twin's ontological and data domain. For instance, in a cyber domain, there is a need to propagate risk from cyber impacts through cyber assets to processes. In a production domain, there is a need to propagate risk from activities through sub processes to parent processes. Furthermore, each domain may have different relevant risk aspects. For instance, in the cyber domain, an attacker could trigger an impact over asset's confidentiality. In the production domain, a problem with an asset or process could impact the quality of the resulting product.

To provide context for implementations of the present disclosure, and as introduced above, computer networks are susceptible to attack by malicious users (e.g., hackers). For example, hackers can infiltrate computer networks in an effort to obtain sensitive information (e.g., user credentials, payment information, address information, social security numbers) and/or to take over control of one or more systems. Computer networks are used to execute processes that support operations of enterprises and/or industrial infrastructures. Enterprises, in general, and industrial infrastructures, in particular, are increasingly connected to external networks such as the Internet. As such, processes that were once isolated from the open Internet network, are now vulnerable to external cyber-attacks. As the frequency and derived impact of these attacks increase, there is a need to prioritize and mitigate risks in order of importance to the operations.

In an effort to defend against cyber-attacks, knowledge graphs can be generated, which represent potential lateral movements of adversaries within computer networks. A knowledge graph can be used to understand how a computer network can be hacked and undesirable consequences that can result. Accordingly, knowledge graphs can be described as an important tool in developing anti-hacker defenses. For example, a knowledge graph can be used to identify the most vulnerable components within a computer network, and can be used to evaluate fixes of vulnerabilities that the knowledge graph reveals (e.g., by fixing a limited number of issues, any adversary attack on the computer network, or on certain components in the computer network can be stopped). While much research has been dedicated to the analysis of a single knowledge graph, little focus has been given to the analysis and comparison of multiple knowledge graphs. In comparing multiple knowledge graphs, the difference between the knowledge graphs is a target of interest, as differences can reveal vulnerabilities that were added, were removed or that persisted across all knowledge graphs.

In view of the above context, implementations of the present disclosure are directed to prioritizing remedial actions for cyber security. More particularly, implementations of the present disclosure are directed to automated process-aware recommendation of remedial actions to mitigate cyber security. As described in further detail, prioritization of remedial actions can include determining a risk assessment based on a knowledge graph, and generating a prioritized list of remedial actions based on the risk assessment and a risk tolerance profile, the prioritized list of remedial actions being generated by a mitigation simulator.

In some examples, automated prioritization of remedial actions of the present disclosure can be realized within an agile security platform that considers attack complexity within an interconnected cyber infrastructure with a variety of attack paths to comprehensively address real attack scenarios. It is contemplated, however, that implementations of the present disclosure of the present disclosure can be realized in any appropriate cyber security platform.

In general, the agile security platform provides a cyber-threat analysis framework based on characterizing adversarial behavior in a multi-stage cyber-attack process. As described in further detail herein, how a threat proceeds within a network is investigated using a knowledge graph and all possible attack stages are identified. In some implementations, each stage can be associated with network attributes. Using a holistic view of threat exposure provided by knowledge graphs, attack techniques and tactics are incorporated into stepping stones found in knowledge graphs.

In further detail, the cyber-threat analysis framework adds context to each attack stage using a real-world knowledge base of adversary tactics and techniques to more comprehensively characterize progression along the attack path. In some implementations, an attack path analysis model identifies a level of difficulty in taking a path by considering the complexity of the path, the skill set of the attacker, and the like. Implementations of the present disclosure provide a path hardness that is measured in terms of a capability of the attacker and challenges. The insight into the level of difficulty of an attack path in the network helps security administrators to pinpoint critical paths and prioritize path hardening actions.

As described herein, the agile security platform enables continuous cyber and enterprise-operations alignment controlled by risk management. The agile security platform improves decision-making by helping enterprises to prioritize security actions that are most critical to their operations. In some examples, the agile security platform combines methodologies from agile software development lifecycle, IT management, development operations (DevOps), and analytics that use artificial intelligence (AI). In some examples, agile security automation bots continuously analyze attack probability, predict impact, and recommend prioritized actions for cyber risk reduction. In some examples, agile security systems automatically implement actions for cyber risk reduction. In this manner, the agile security platform enables enterprises to increase operational efficiency and availability, maximize existing cyber security resources, reduce additional cyber security costs, and grow organizational cyber resilience.

As described in further detail herein, the agile security platform provides for discovery of IT/OT supporting elements within an enterprise, which elements can be referred to as configuration items (CI). Further, the agile security platform can determine how these CIs are connected to provide a CI network topology. In some examples, the CIs are mapped to processes and services of the enterprise, to determine which CIs support which services, and at what stage of an operations process. In this manner, a services CI topology is provided.

In some implementations, the specific vulnerabilities and improper configurations of each CI are determined and enable a list of risks to be mapped to the specific IT/OT network of the enterprise. Further, the agile security platform of the present disclosure can determine what a malicious user (hacker) could do within the enterprise network, and whether the malicious user can leverage additional elements in the network such as scripts, CI configurations, and the like. Accordingly, the agile security platform enables analysis of the ability of a malicious user to move inside the network, namely, lateral movement within the network. This includes, for example, how a malicious user could move from one CI to another CI, what CI (logical or physical) can be damaged, and, consequently, damage to a respective service provided by the enterprise.

FIG. 1 depicts an example architecture 100 in accordance with implementations of the present disclosure. In the depicted example, the example architecture 100 includes a client device 102, a network 106, and a server system 108. The server system 108 includes one or more server devices and databases (e.g., processors, memory). In the depicted example, a user 112 interacts with the client device 102.

In some examples, the client device 102 can communicate with the server system 108 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 108 includes at least one server and at least one data store. In the example of FIG. 1, the server system 108 is intended to represent various forms of servers including, but not limited to a web server, an application server, a proxy server, a network server, and/or a server pool. In general, server systems accept requests for application services and provide such services to any number of client devices (e.g., the client device 102 over the network 106). In accordance with implementations of the present disclosure, and as noted above, the server system 108 can host an agile security platform.

In the example of FIG. 1, an enterprise network 120 is depicted. The enterprise network 120 represents a network implemented by an enterprise to perform its operations. In some examples, the enterprise network 120 represents on-premises systems (e.g., local and/or distributed), cloud-based systems, and/or combinations thereof. In some examples, the enterprise network 120 includes IT systems and OT systems. In general, IT systems include hardware (e.g., computing devices, servers, computers, mobile devices) and software used to store, retrieve, transmit, and/or manipulate data within the enterprise network 120. In general, OT systems include hardware and software used to monitor and detect or cause changes in processes within the enterprise network 120 as well as store, retrieve, transmit, and/or manipulate data. In some examples, the enterprise network 120 includes multiple assets. Example assets include, without limitation, users 122, computing devices 124, electronic documents 126, and servers 128.

In some implementations, the agile security platform is hosted within the server system 108, and monitors and acts on the enterprise network 120, as described herein. More particularly, and as described in further detail herein, one or more knowledge graphs representative of the enterprise network are generated in accordance with implementations of the present disclosure. For example, the agile security platform detects IT/OT assets and generates an asset inventory and network maps, as well as processing network information to discover vulnerabilities in the enterprise network 120. The agile security platform executes automated prioritization of remedial actions of the present disclosure based on the network information.

In some examples, the agile security platform provides one or more dashboards, alerts, notifications and the like to cyber security personnel that enable the cyber security personnel to react to and remediate security relevant events. For example, the user 112 can include a cyber security expert that views and responds to dashboards, alerts, and/or notifications of the agile security platform using the client device 102.

In some examples, the agile security platform operates over multiple phases. Example phases include an asset discovery, anomaly detection, and vulnerability analysis phase, a cyber resilience risk analysis phase, and a cyber resilience risk recommendation phase.

With regard to the asset discovery, anomaly detection, and vulnerability analysis phase, discovering what vulnerabilities exit across the vertical stack and the relevant use cases is imperative to be conducted from the enterprise IT to the control systems. A focus of this phase is to generate the security backlog of issues, and potential remediations.

Rather than managing each technology layer separately, the agile security platform addresses lateral movements across the stack. Through devices, communication channels (e.g., email, TCP/IP), and/or operation systems, vulnerabilities are addressed within the context of a service (e.g., a service that the enterprise offers to customers), and a cyber kill chain to a target in the operation vertical, generating operation disturbance by manipulation of data. The notion of a CI assists in mapping dependencies between IT/OT elements within a configuration management DB (CMDB). A so-called security CI (SCI) maps historical security issues of a certain managed security element and is mapped into a security aspect of a digital twin.

As a result, a stack of technologies is defined, and is configured in a plug-in reference architecture (replaceable and extensible) manner. The stack addresses different aspects of monitoring, harvesting, and alerting of information within different aggregations views (dashboards) segmented according to owners and relevant IT and security users. An example view includes a health metric inserted within the dashboard of an enterprise application. In some examples, the health metric indicates the security condition of the underlying service and hence, the reliability of the provided data and information. Similar to risks that can be driven by labor, inventory, or energy, security risk concern can be presented and evaluated in the operations-level, drilled-through for additional transparency of the issue, and can be optimally remediated by allocating investments to automation or to security and IT personal with adequate operations awareness.

With regard to the cyber resilience risk analysis phase, each vulnerability may have several remediations, and each has a cost associated with it, either per internal personnel time, transaction, service, or retainer, as well as the deferred cost of not acting on the issue. A focus of this phase is to enable economical decision-making of security investments, either to be conducted by the IT and security team or directly by automation, and according to risk mitigation budget.

In further detail, observing a single-issue type and its remediations does not reflect the prioritization between multiple vulnerabilities. Traditional systems are based on global risk assessment, yet the context in which the SCI is part of is missing. The overall risk of a process matters differently for each enterprise. As such, remediation would occur according to gradual hardening of a process according to prioritization, driven in importance and responsibility by the enterprise, not by gradual hardening of all devices, for example, in the organization according to policy, without understanding of the impact on separated operational processes. Hardening of a system should be a decision of the enterprise to drive security alignment with the enterprise.

In addition, as the system is changed by gradual enforcement and hardening, new issues are detected and monitored. Hence, making a big bang decision may be not relevant to rising risks as they evolve. Prioritization according to value is the essence of this phase. It is a matter of what is important for the next immediate term, according to overall goals, yet considering changes to the environment.

With regard to the cyber resilience risk recommendation phase, a focus is to simplify approved changes and actions by proactive automation. In traditional systems, the action of IT remediation of security issues is either done by the security team (such as awareness and training), by creating a ticket in the IT service system (call for patch managements), and/or by tools that are triggered by security and monitored by IT (automatic deployment of security policies, change of authentication and authorization, self-service access control management, etc.). Some operations can be conducted in a disconnected mode, such as upgrading firmware on an IoT device, in which the operator needs to access the device directly. Either automated or manual, by IT or by security, or by internal or external teams, the entire changes are constantly assessed by the first phase of discovery phase, and re-projected as a metric in a context. Progress tracking of these changes should also occur in a gradual manner, indicating maintenance scheduling on similar operational processes, hence, driving recommendations for frequent actions that can be automated, and serve as candidates to be self-managed by the operations owners and systems users.

In the agile security platform, acting is more than automating complex event processing (CEP) rules on alerts captured in the system logs and similar tools. Acting is started in areas highlighted according to known patterns and changing risks. Pattern detection and classification of events for approved automation processes (allocated transactions budget), are aimed at commoditization of security hardening actions in order to reduce the attention needed for prioritization. As such, a compound backlog and decision phase, can focus further on things that cannot be automated versus those that can. All issues not attended yet are highlighted, those that are handled by automation are indicated as such, and monitored to completion, with a potential additional value of increasing prioritization due to changing risks impact analysis.

The application of graph algorithms to assess the risk spreading level in a system is commonly known as risk propagation. Risk propagation approaches can be used in risk analytics and networks of nodes representing a system, and are aimed at supporting risk identification, quantification, and mitigation activities.

Risk propagation techniques can be applied in different domains where processes play a central role. For instance, risk propagation can be adopted to analyze how occurrences of risk affect the sustainability of producer-consumer networks in supply chains. Similarly, the propagation of risk is used to assess the impact of cyber-attacks on different assets of a given system. The risk propagation solution can be used to measure the cascading effect of risk in systems that involve dependencies between processes and physical objects. For instance, cybersecurity risk can be propagated from a cyber infrastructure to the processes of an organization. A machine breakdown can affect the productivity of a company. Lead-time variability risk can affect a supply chain or a manufacturing environment. The risk of machinery energy consumption deviation from the allowed thresholds can be calculated and propagated to the risk to the processes of the host organization.

A process-aware approach can be implemented to evaluate risk propagation. The approach leverages knowledge about how different processes, objects, and activities connect with each other, in domain-specific contexts (e.g., customer relationships, enterprise planning, cyber assets, and supply chain), and also at a domain-agnostic level, by covering concepts that are present in different application contexts. process-aware approach that is aimed at facilitating the assessment of risk propagation between processes and objects with different levels of abstraction.

The contribution leverages the combination of an ontology, which supports semantics-based intelligent systems, encoding a set of rules to be used for representing the risk dependencies within a system composed of objects and processes, and ii. a method to calculate the propagation of risk within the represented system.

The approach facilitates the task of propagating a risk that was measured at the physical level of a system (e.g., a machine breakdown), towards its process abstract level (e.g., company productivity). This involves the capability to investigate how an attacker can compromise both the infrastructure assets and the process goals of an organization.

The approach enables users to easily assess risk and, in particular, to easily access the risk propagation output. Visualization support is provided to enable a user to browse and analyze the data. The output can be filtered according to user-input queries.

The approach can support identifying the root causes of risk, prioritizing the mitigation activities, and suggesting a relevant remediation plan. The approach keeps track of risk propagation over time. For instance, the risk propagation can change after applying a mitigation step. For the same processes and objects, there may be different risk propagation phenomena at different times.

The approach allows discovering elements that are at risk even if they are not directly connected. This can happen by considering different types of relations between elements at risk, like causal dependencies or physical connections. The approach enables the propagation of risk when an element is a part of a causal chain or a component of a device.

Figure 2A:
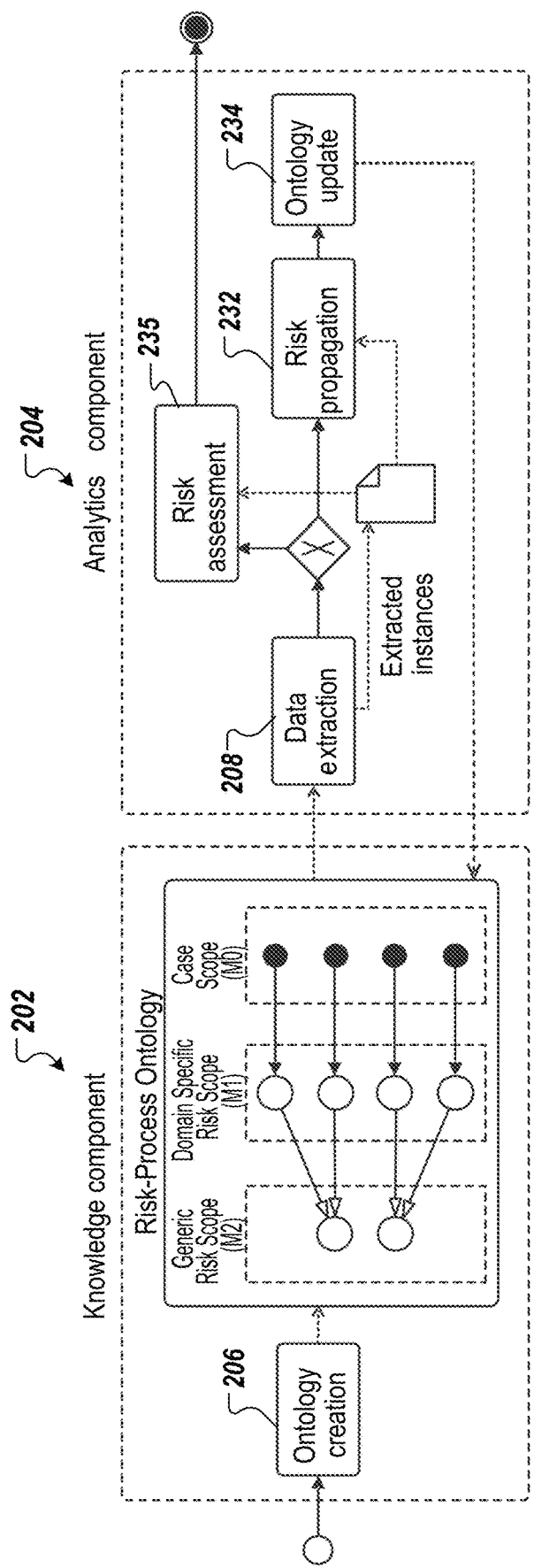
FIG. 2A depicts a process for performing risk propagation analytics using domain-specific concepts.

FIG. 2A depicts a process for performing risk propagation analytics using domain-specific concepts. The process includes a knowledge component 202 and an analytics component 204.

Risk can be used to quantify the possibility of reaching some given objectives, where such a quantity value is derived from the combination of the probability that a certain risk event occurs (as a perturbation of the plan for reaching the objectives) and a set of severity values. For example, an attacker may have read/write access to a database and can damage the database integrity and confidentiality. The read/write access represents the risk event, and the severity values will be associated with the database integrity and confidentiality features.

Risk can be considered an effect of uncertainty on objectives. Risk is a polysemic term, which covers multiple phenomena including risk magnitude, risk assessment, vulnerability, loss and threat events, etc.

Risk can be calculated as $R=P*(S1, \ldots, Sn)$, where P provides the probability that a risk event occurs, and each Sj encodes a severity value. The propagation task can start from a given risk value, associated to a given risk event (e.g., damage to a device). The risk associated with the risk event can spread through the elements (e.g., objects and processes) involved, either directly or indirectly, in the event itself.

The knowledge component 202 can be deployed on a graph database platform. The analytics component 204 can be implemented as an application that interacts with the graph database platform.

The program and the database interact at multiple stages. First, the ontology is imported into the database (e.g., ontology creation 206). Second, the export from the database into the program memory towards the risk propagation task (e.g., data extraction 208). Thirdly, the database is updated with results of risk propagation 232 (e.g., ontology update 234). Lastly, risk assessment 235 is performed using the updated ontology.

Figure 2B:
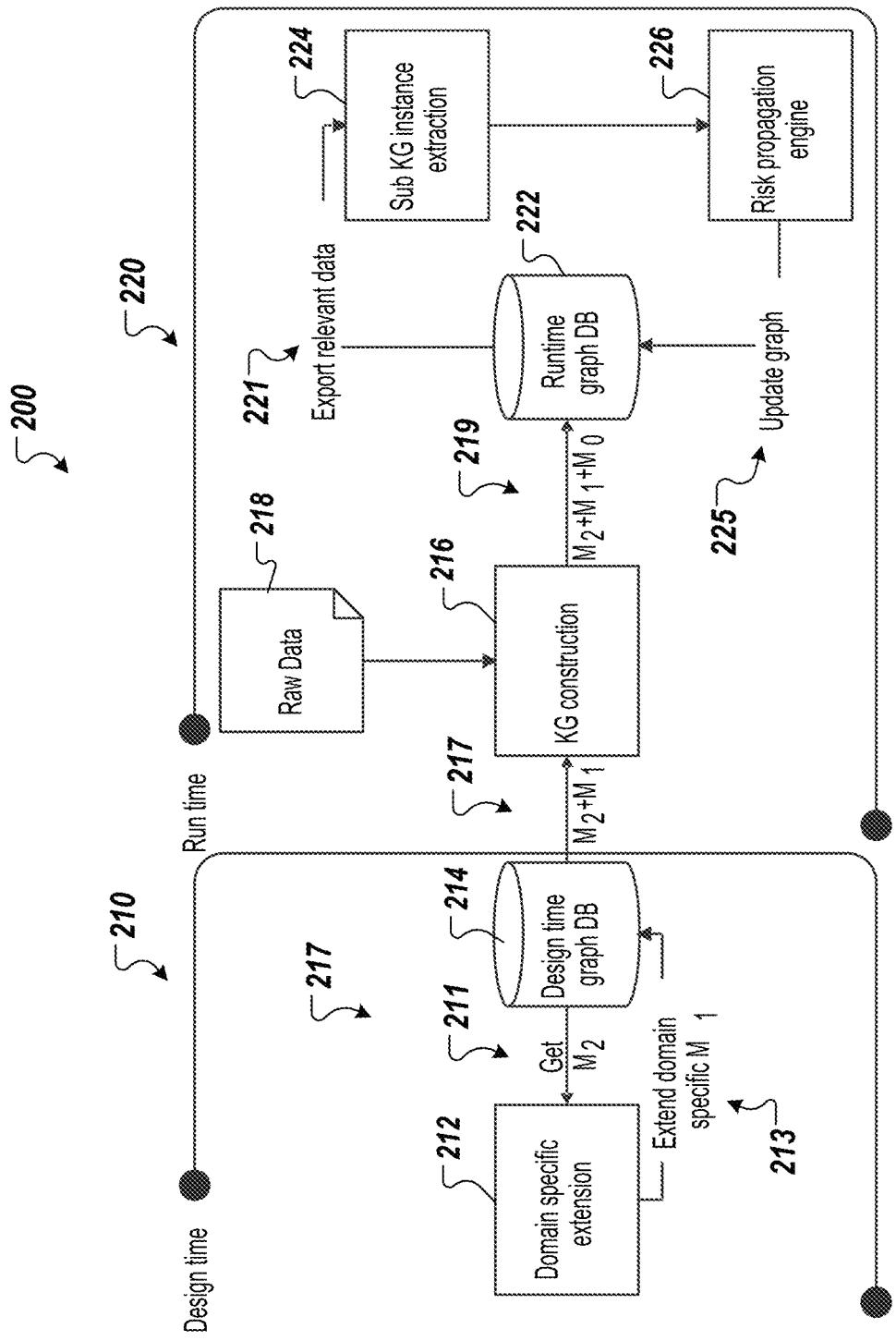
FIG. 2B depicts a conceptual architecture for performing risk propagation analytics using domain-specific concepts.

FIG. 2B depicts a conceptual architecture 200 for performing risk propagation analytics using domain-specific concepts applied to generic ontologies. The system architecture 200 is divided into two modules, including a design time module 210 and a run time module 220.

The design time module 210 performs ontology mapping by extending base phenomenon (by inheritance) into a domain-specific ontology. For example, the design time module 210 can obtain an $M_2$ layer 211 and create an $M_1$ 213 layer by applying a domain specific extension 212. The $M_1$ and $M_2$ layers can be stored in a design time graph database 214.

Once the domain-specific ontology is created, the run time module 220 can perform knowledge graph construction 216 using the $M_1$ and $M_2$ layers 217. KG construction 216 maps the $M_0$ layers to the $M_1$ and $M_2$ layers. The run time module 220 can use raw data 218 to construct a knowledge graph instance (subject to $M_1$).

The knowledge graph instance 219, including $M_0$, $M_1$, and $M_2$ layers, can be imported into a runtime graph database 222. The ontology model's concepts, relations, and attributes are expressed as classes, object properties, and data properties, respectively. $M_0$ can be expressed as classes' individuals and their properties assertions. Once the OWL file of the three scopes is constructed, the ontology is imported to the runtime graph database 222. The Owl file can be transformed into a Labeled Property Graph (LPG). structure. In this structure, the constructs of the model and the data are represented as nodes and edges within the runtime graph database 222.

The run time module 220 performs multi-stage risk propagation calculations. The calculations are performed to determine the propagation of risk within a given system. The run time module 220 exports relevant data 221 from the runtime graph database 222 by performing a sub-knowledge graph instance extraction 224.

A risk propagation engine 226 receives the sub-knowledge graph in a standard format of a graph structure. At this stage only relevant data ($M_0$ level), extracted using an $M_2$ level query, is included in subgraphs provided to the risk propagation engine 226. The subgraphs can include a first subgraph for hierarchy relators, and a second subgraph for process dependency relators. The risk propagation engine 226 performs risk propagation analysis using the relevant data from the runtime graph database 222 provided in the subgraphs. The risk propagation engine 226 updates the knowledge graph 225 according to the risk propagation results.

Figure 3:
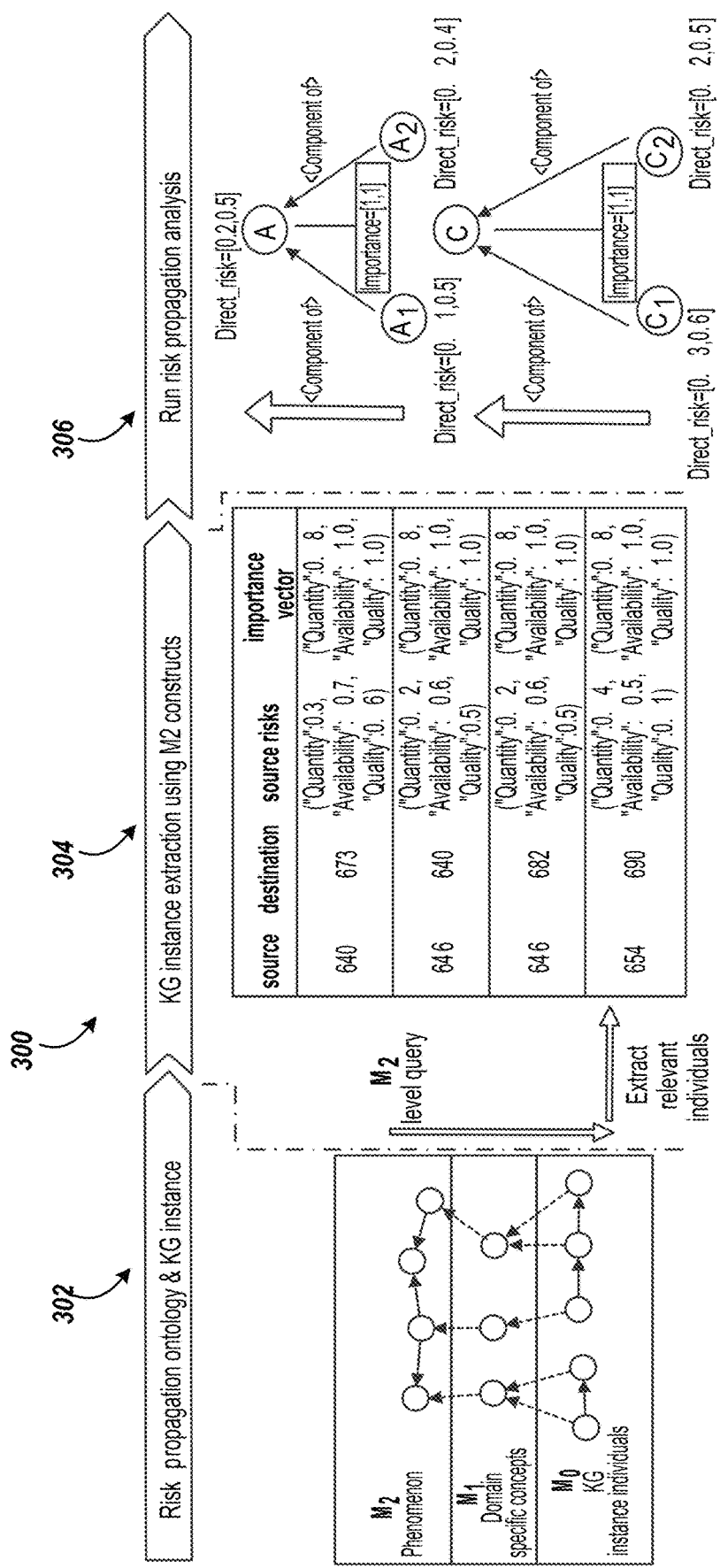
FIG. 3 depicts an example process for developing ontology-based analytics.

FIG. 3 depicts an example process 300 for developing ontology-based analytics. The process 300 can be implemented in order to run advanced analytics (e.g., risk propagation analytics) in a domain-agnostic manner by developing ontology-based analytics. An ontology supports functionalities typical of semantics-based intelligent systems, representing a system with processes and objects having different levels of abstraction.

The process 300 includes three main steps. The first step 302 includes using a mapping ontology editor tool to create a multi-layer ontology. The $M_2$ layer represents phenomenon concepts, and the $M_1$ layer represents domain-specific concepts. The $M_2$ layer and the $M_1$ layer are mapped to a knowledge graph instance $M_0$.

The second step 304 includes automatically extracting relevant nodes from $M_0$ into a standard structure according to an $M_2$ level query.

The third step 306 includes running risk propagation analysis using an analytics component to compute step-wise and aggregated risks to be displayed. The ontology-based risk propagation includes three primary components: mapping, knowledge graph construction, and multi-stage risk propagation calculations. The process 300 can be applied to various domains and use cases, including cyber-security and production use cases.

Figure 4A:
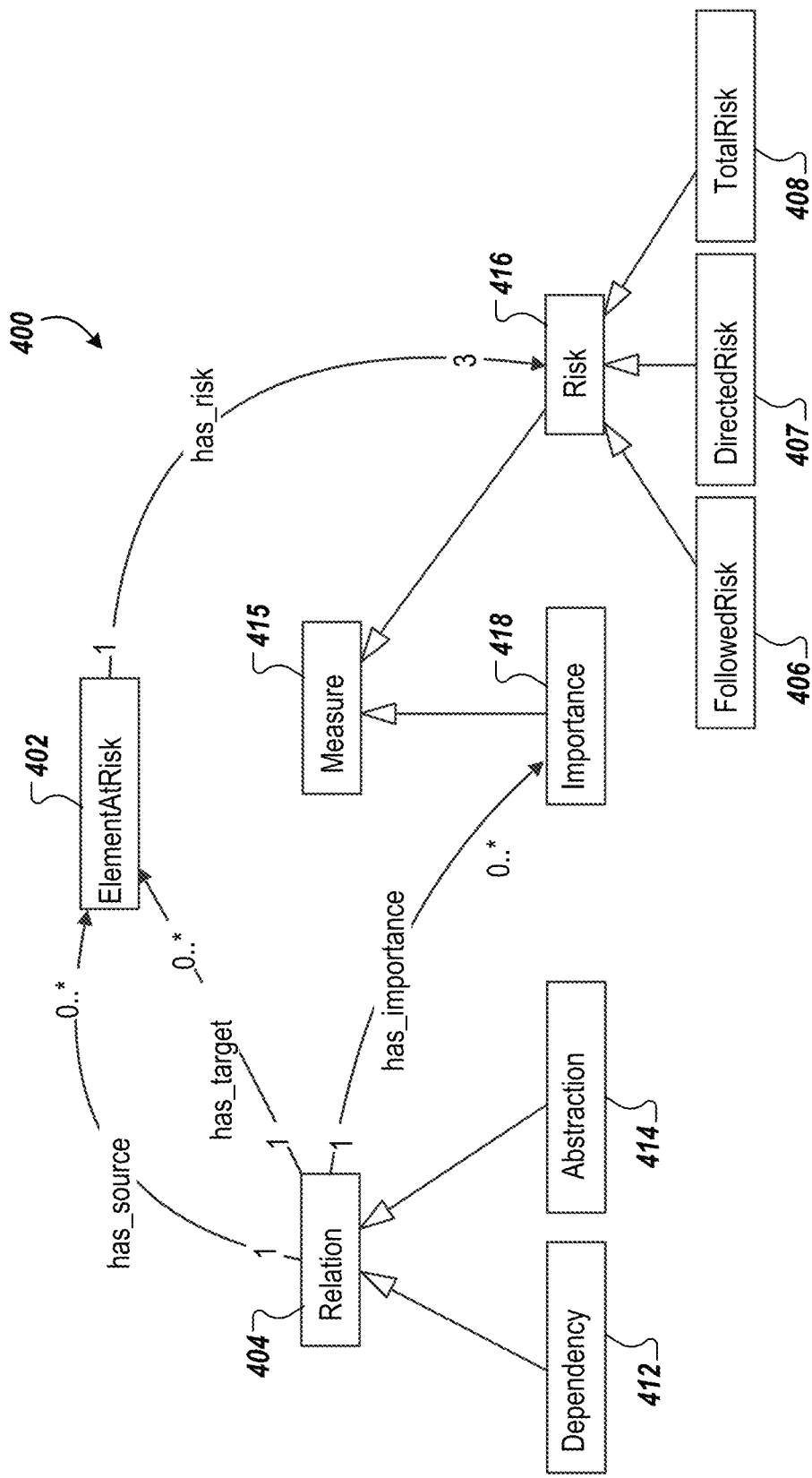
FIG. 4A is representation of a phenomenon layer of a knowledge graph.

FIG. 4A is representation of a phenomenon layer 400 of a knowledge graph. The knowledge component holds an ontology (Risk-Process Ontology), which is in turn divided into three scopes. The first scope, M2, includes a set of generic concepts and relations related to risk, which are independent of any specific domain. The second scope, M1, extends M2 with a set of domain-specific concepts and relations. M1, is then mapped into the third scope M0, includes a use-case-specific types and instances.

The phenomenon layer includes an Element at Risk 402. The Element at Risk 402 can be, for example, a process type at risk or an object at risk. In some examples, an Element at Risk 402 can be specialized in a domain-specific layer by a concept representing a physical component of a system, such as a machine, or an abstract concept such as an activity.

Within a system of Element at Risk 402, the risk 416 is propagated from one element to another according to their relations 404. In order to model risk propagation, two main types of relations 404 are identified. Relations 404 can include dependency relations 412, which can be used to model phenomena where the risk 416 is propagated through a workflow composed of processes. For instance, two activities can be connected by dependency relations 412 such as "triggers" or "causes." Relations 404 can include abstraction relations 414 that represent cases where the risk 416 is propagated from a lower to a higher level of abstraction. For example, the risk of a physical machine can be propagated to related activities.

Given a network of elements at risk 416 and their connections, various types of risk can be identified. A type of risk is Followed Risk 406, or indirect risk. Followed Risk 406 is risk propagated through dependency relations. Another type of risk is Directed Risk 407. Directed Risk 407 is risk propagated through abstraction relations. Another type of risk is Total Risk 408. Total Risk 408 represents the overall risk of an object, considering both the Directed Risk 407 and Followed Risk 406.

The knowledge component is aimed at supporting risk calculation from different perspectives and aspects, which can be represented within M2. For example, in a cybersecurity use case, the risk can be quantified according to its potential impact on availability, confidentiality, and integrity of the related activities. In a sustainability use-case, the risk of a carbon-footprint can be propagated by focusing on the deviation from the machine level to the process level. Finally, the knowledge component allows the user to control the amount of risk propagated from one element to another via one or more measures 415. Measures can include importance 418, which can be used to weight any given relation 404. For example, a confidentiality risk that was measured over a device and propagated to its correlated activity should not necessarily be propagated to the following activity. In that case, the system supports omitting the propagation of a confidentiality risk from an activity to the following by setting an importance of zero.

Figure 4B:
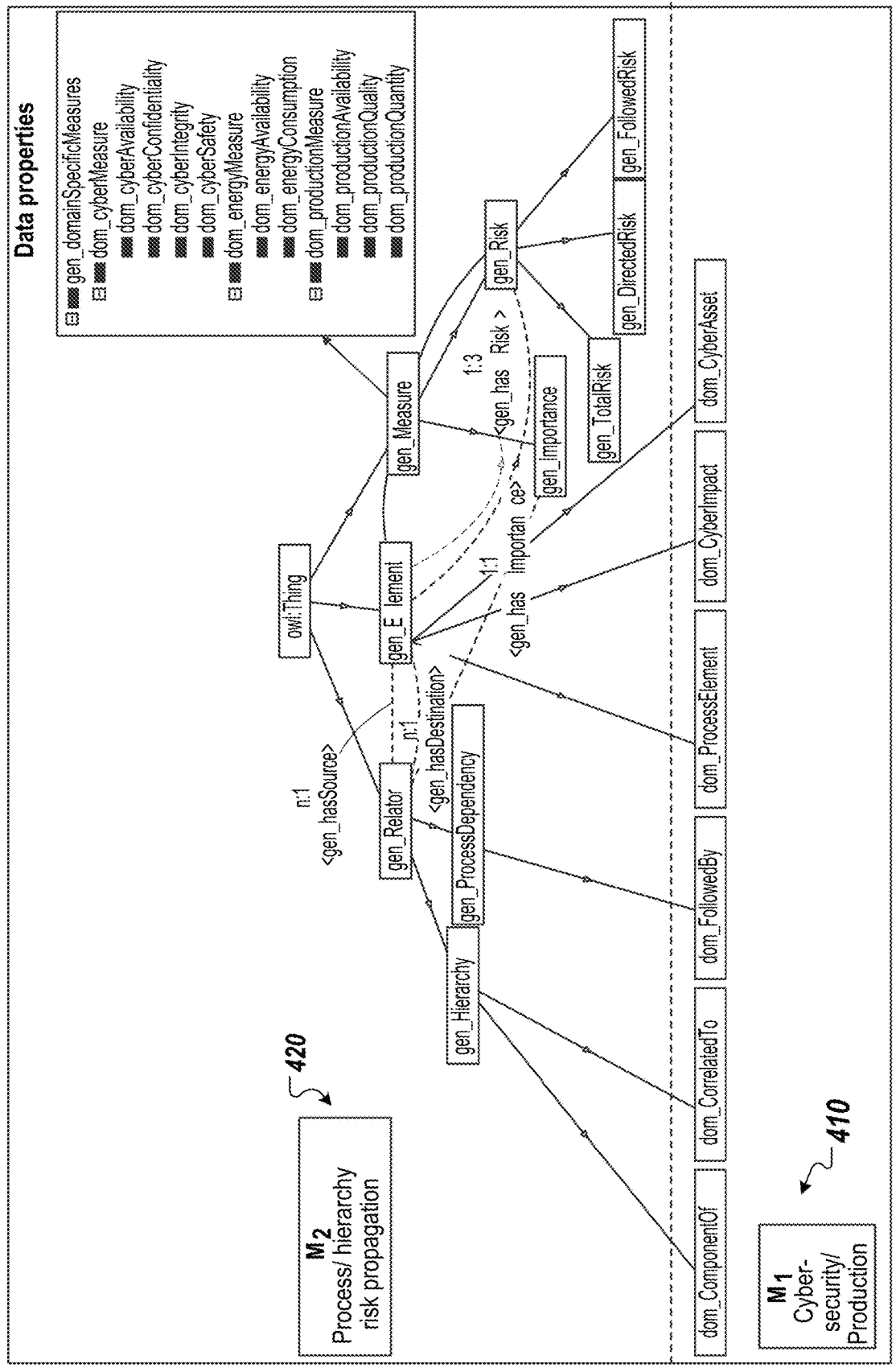
FIG. 4B depicts an example risk propagation ontology.

FIG. 4B depicts an example mapping of risk propagation ontology 450. The ontology 450 includes an $M_1$ ontology layer 410 and an $M_2$ ontology layer 420. The ontology 450 can be generated, for example, by the design time module 210 of the architecture 200.

The $M_2$ ontology layer 420 is a phenomenon layer. The $M_2$ ontology layer 420 holds generic, abstracted classes, properties, and relations which could be extended by the $M_1$ layer by inheritance. The $M_1$ ontology layer 410 is a domain-specific layer. The $M_1$ ontology layer 410 can include case-specific classes, properties, and relations.

The $M_1$ ontology layer 410 and an $M_2$ ontology layer 420 can enable a domain-agnostic system for creating ontologies and evaluating risk propagation. For example, the system can use $M_2$ level processing too retrieve $M_1$ results. In an example risk propagation task, risk can be propagated through all the instances of an element. There may be multiple types of elements, such as cyber asset, cyber impact, and process element.

The ontology 450 can be provided to the run time module 220 of the architecture 200. The run time module 220 can perform knowledge graph construction using the ontology 450 and raw data 218. The knowledge graph can be created from the raw data 218, according to $M_1$ ontology, and stored in the runtime graph database 222. The knowledge graph can be created by running over the raw data and extracting entities and relations. An output is a knowledge graph instance 219 subject to $M_1$, such that the knowledge graph instance 219 is specific to the domain specified by the $M_1$ layer.

Figure 5A:
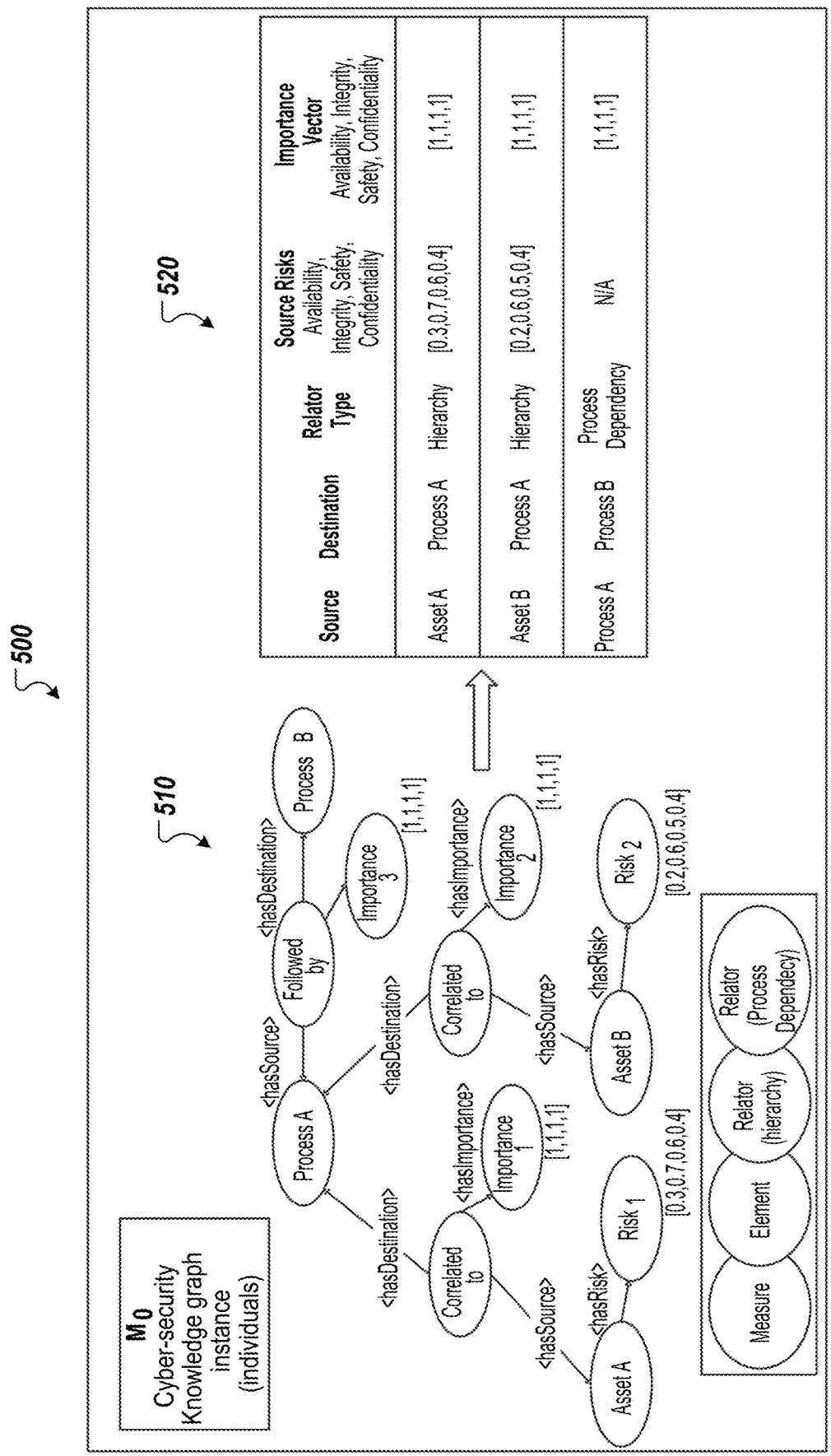
FIG. 5A depicts an example ontology-based graph transformation.

FIG. 5A depicts an example ontology-based graph transformation 500. The graph transformation 500 is performed on a sub-knowledge graph 510.

The sub-knowledge graph 510 can be generated, e.g., by the run time module 220 performing sub-knowledge graph instance extraction 224. Input to the sub-knowledge graph instance extraction 224 includes a knowledge graph instance from the runtime graph database 222, subject to the domain-specific concepts of the $M_1$ layer. Output from the sub-knowledge graph instance extraction 224 includes sub-graphs of knowledge graph instance, e.g., sub-knowledge graph 510, in a standardized format.

Once the Risk-Process ontology is generated, the analytics component 204 is used for a data extraction step that consists of querying the ontology through the M2 constructs. The data extraction step returns a labeled property graph structure where each node represents an instance of an Element at Risk and each edge represents an instance of a Relation. The Risk and Importance values are then represented as vectorized properties of nodes and relationships respectively.

The example graph transformation 500 illustrates a transformation based on a query to get all individuals of type "Element" that have a relator type of "Hierarchy" or "Process Dependency," including their "Risk" and "Importance." The query extracts the required information to input to risk propagation algorithm (e.g., risk propagation engine 226).

The result of the transformation is table 520 including the obtained elements and associated sources, destinations, relator types, source risks, and importance vectors. The proposed approach assumes that the risk over the leaf nodes (elements with a lower level of abstraction) is given prior to the risk propagation task.

The table 520 is an example sub-knowledge graph instance extraction 224, as shown in FIG. 2B. The sub-knowledge graph instance extraction 224 is input to the risk propagation engine 226.

Once the labeled property graph is generated, risk propagation can be performed. This task is performed in two steps, where, at each step, the graph is traversed via a Depth-first Search (DFS) algorithm. A risk propagation for a single node is in turn defined according to a risk function denoted as max_per_aspect. A worst-case scenario approach can be applied by quantifying the risk according to the maximal risk per aspect. For example, in a case where an activity depends on two devices, and each has a different availability risk. A worst-case scenario approach assumes that both devices could be compromised by an attacker, and a shutdown of at least one device will disable the correlated activity. Thus, the propagated risk towards the activity is set according to the maximal availability risk of both devices. The risk function gets a bag of vectors ordered by the different risk aspects and returns the maximal value for each aspect.

Figure 5B:
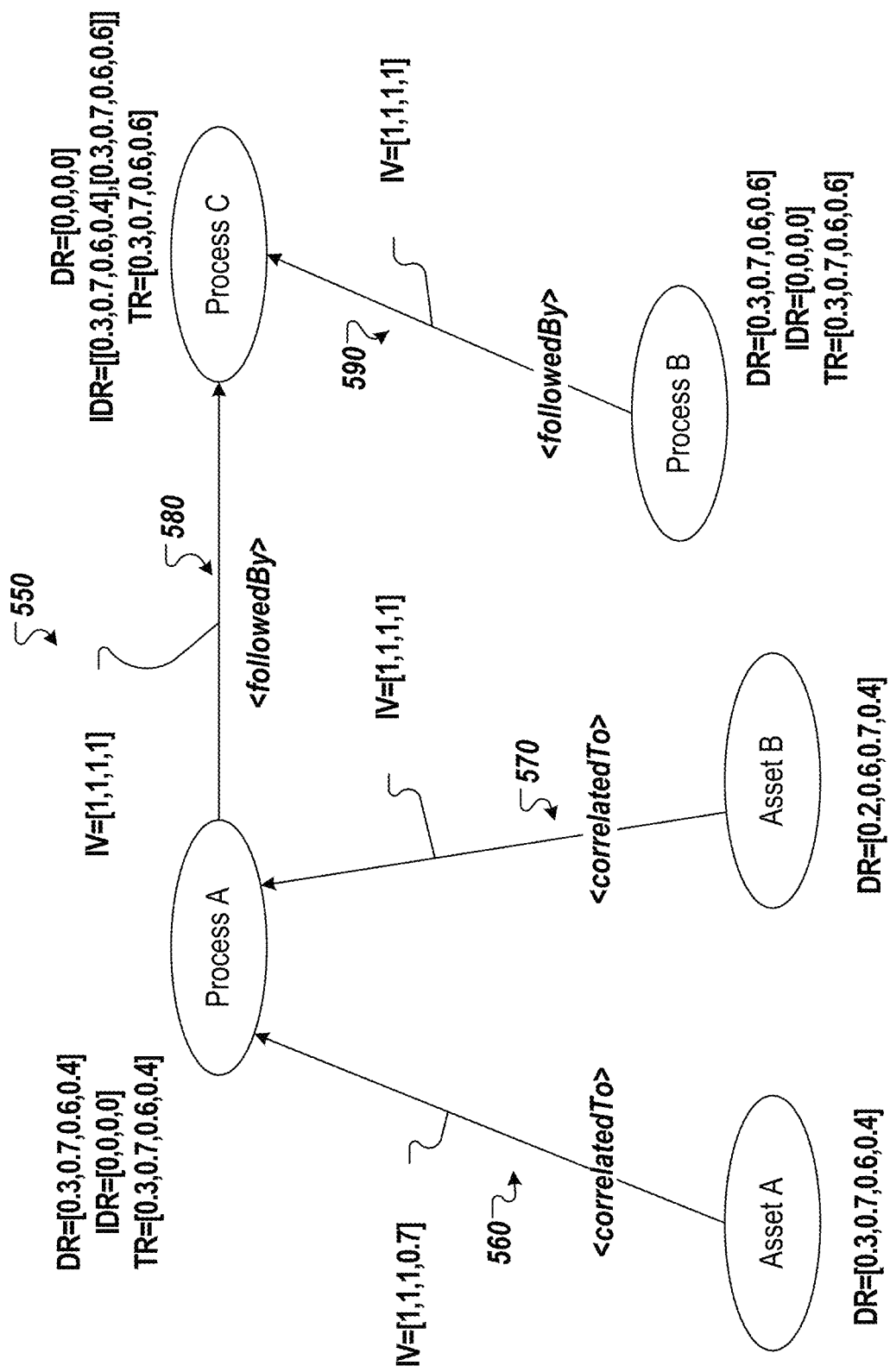
FIG. 5B depicts an example knowledge graph including process dependencies.

FIG. 5B depicts an example knowledge graph 550 including process dependencies. The knowledge graph can be evaluated using a multi-stage risk propagation engine, e.g., risk propagation engine 226. Input to the risk propagation engine 226 can include subgraphs of a knowledge graph instance in a standardized format. Output from the risk propagation engine 226 can include an updated knowledge graph 225 with propagated risk.

The knowledge graph 550 includes nodes representing Asset A and Asset B, and nodes representing process elements A, B, and C. The knowledge graph 550 permits risk assessment at a process level.

The knowledge graph 550 also includes connections representing process dependencies between assets and processes, and dependencies between process elements. For example, the knowledge graph 550 includes a connection 560 representing a correlation between Asset A and Process A, and a connection 570 representing a correlation between Asset B and Process A. The knowledge graph 550 includes a connection 580 representing that Process C follows Process A, and a connection 590 representing that Process C follows Process B.

The knowledge graph 550, includes process element nodes, can be used to account for risk propagation through various types of dependencies between process elements. For example, for each process element node, a direct risk (DR), indirect risk (IDR), and total risk (TR).

For each connection of the knowledge graph 550, an importance vector (IV) can be assigned. The IV is a transformation vector of the risk from one element to another element. The IV indicates an amount of the risk that is to be carried from one node to a connected node. The IV represents an amount of risk propagated between nodes connected by an edge of the knowledge graph.

For each node of the knowledge graph 550, a set of incoming nodes (IN) can be determined. For example, for the process element node for Process C, the set of incoming nodes includes Process A and Process B.

The vectors for each node includes the Directed Risk vectors of the incoming nodes, multiplied by the corresponding Importance Vectors over the incoming edges. The multiplication is element wise, namely, each element in the Directed Risk vector is multiplied with the corresponding element in the Importance vector.

Direct risk is a risk vector that is measured directly over an element and propagated to its connected nodes. The following example relationship is provided:

$$DR=\text{max\_aspect}(IV*DR \text{ for } IV,DR \text{ in } IN)$$

where:
DR—Direct Risk
IV—Importance Vector
IN—Set of Incoming Nodes

Once the Directed Risk is propagated across the graph, the second step occurs according to two main sub-steps. The Followed Risk vector of a node is calculated. The vectors for each node include the Total Risk vectors of its incoming nodes multiplied by the corresponding importance vectors over the incoming edges.

Indirect risk, or followed risk, is an impact of a risk vector from an element to another that has process dependency relation. If the set of incoming nodes is zero, then indirect risk is zero and the importance vector is zero.

The Total risk of a node is calculated. The vectors for a node include its Followed Risk and Directed Risk vectors. Total risk is the overall risk vector over an element considering both direct and indirect risk vectors for the element. The following example relationship is provided:

$$TR=\text{max\_aspect }(DR,IDR)$$

The indirect risk for a following node is based on the total risk of incoming nodes. The following example relationship is provided:

$$IDR=[[IV*TR] \text{ for } IV, TR \text{ in } IN]$$

where:
IDR—Indirect Risk
IV—Importance Vector
TR—Total Risk
IN—Set of incoming nodes The knowledge graph 550 can be traversed using an algorithm such as a depth-first search (DFS) algorithm. DFS is an algorithm for traversing or searching graph data structures. The algorithm starts at the root node (selecting some arbitrary node as the root node in the case of a graph) and explores as far as possible along each branch before backtracking. Input to the DFS algorithm includes the knowledge graph with source node and related child node, and a function to be applied. Output of the DFS algorithm includes the knowledge graph with propagated risk. Once the risk propagation task is concluded, the results are updated in the Risk-Process ontology.

For consideration of risk propagation, assumptions can be made. In some examples, an assumption is that a node can be represented only within a single graph level. Other assumptions can include that leaf nodes do not hold incoming edges, that each leaf node has a pre-defined direct risk which is domain-specific, and that risk propagation uses the same risk function across all graph levels. Additional assumptions can include that the methodology does not handle cycle, and that nodes are homogenous (e.g., nodes share the same risk aspects).

An example algorithm for multi-stage risk propagation is provided in Table 1:

TABLE 1

Algorithm 1: Total risk calculation

Input: Graph G with source node ( u) and incoming node ( v) related with relation r, function to be applied
Output: Graph G with propagated risk
$DR_u = f(DR_v, IV_r)$
$TR_u = f(DR_u, TR_v)$
let dfs(node, func) be:
|    let result be empty list
|    for each child_node in
| node:
|       results += dfs(child, func)
|    return func(node)
   for node in G:
|    dfs(node, $DR_u$)
   for node in G:
|    dfs(node, $TR_u$)

The risk propagation engine 226 takes subgraphs as an input and uses predefined and/or user defined functions to calculate the risk for each node resulting new graph with propagated risk. Direct risk and indirect risk can be represented by different subgraphs, thus it may be necessary to traverse a graph twice.

Finally, the analytics component 204 includes risk assessment. The ontology can be queried to assess and analyze the risk state of the whole system, namely the risk of the Element at Risk with the highest level of abstraction. Furthermore, through the risk assessment step, an alert can be presented considering the deviation of the quantified risk from a pre-defined threshold (denoted as a cardinal risk).

Similarly, risk assessment can be implemented to analyze identify an element at cardinal risk, identify the risk's root causes, and prioritize mitigation steps accordingly. Still, the proposed approach enables the detection of elements at risk, even if their directly connected elements are not at risk. For example, a manual activity could be affected by a cyberattack since it is followed by another activity that depends on a device at risk of being compromised.

Risk assessment can be performed over elements including businesses, processes, and activities. For each element, a risk vector is generated. The vector enables prioritization of risks.

Figure 6A:
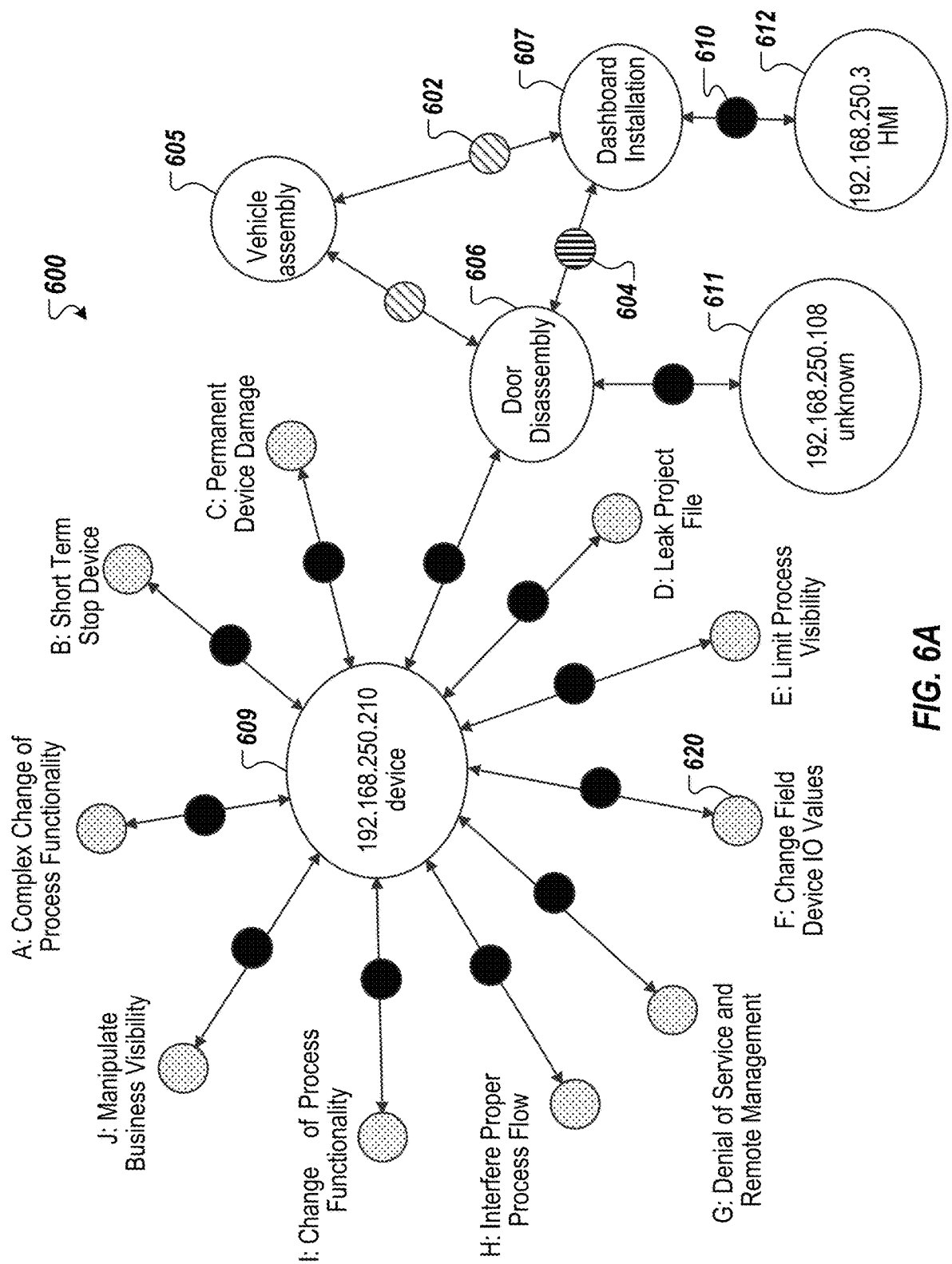
FIG. 6A depicts a knowledge graph for a use case of implementations of the present disclosure.

FIGS. 6A to 6C depict a use case of implementations of the present disclosure. FIGS. 6A to 6C demonstrate a cybersecurity risk assessment use case of a vehicle assembly manufacturing process. The example demonstrates techniques for quantifying the risk of devices being compromised by a cyberattack, and then measuring the impact over the domain-specific risk scope.

In the example of FIGS. 6A to 6C, the concepts captured by the ontology (e.g., M2 and M1) can be grouped into three groups. A first group is a physical layer including devices (denoted as CyberAsset) that could be compromised by an attacker. A second group includes potential intervention actions (denoted as Cyber-Impact), which an attacker could perform over each device. A third group includes processes (each one grouped as a ProcessElement). Cyber assets and process/activity elements are connected via relations of type CorrelatedTo. Process/activity elements are connected via relations of type ComponentOf and FollowedBy. The CorrelatedTo and ComponentOf relations are classified as Abstraction relations. The FollowedBy is classified as a Dependency relation.

Risk is measured over the different CyberImpact instances and propagated to CyberAsset and ProcessElement instances. Risk is measured according to aspects of confidentiality, integrity, and availability, and is represented in a risk vector. For example, a denial-of-service CyberImpact holds a substantial risk of availability, while a data manipulation Cyber-Impact holds a substantial risk of integrity and confidentiality. Since the risk is measured within an industrial facility, risk is also measured according to a safety aspect.

FIG. 6A shows a knowledge graph 600 instantiating M0 ontology concepts. FIG. 6B shows an example table 650 of the risk propagation output of the represented knowledge graph 600.

The knowledge graph 600 includes FollowedBy nodes (denoted as diagonally-patterned nodes 602) and ComponentOf nodes (denoted as vertically-patterned nodes 604). The FollowedBy nodes and the ComonentOf nodes represent relations between process elements. The process elements include VehicleAssembly element 605, DoorDisassembly element 606, and DashboardInstallation element 607).

The knowledge graph 600 provides cyber assets for each Process-Element as well. This is represented by the CorrelatedTo relation (denoted as black nodes 610) between process elements and cyber assets. For example, DoorDisassembly element 606 is connected with two CyberAsset instances 609, 611. The DashboardInstallation element 607 relates to just one CyberAsset instance 612.

The knowledge graph 600 encodes potential vulnerabilities of the selected cyber assets by connecting them to a set of threat instances, categorized as CyberImpact nodes (denoted as dot-patterned nodes 620). Each CyberImpact node is associated with a respective risk vector.

The knowledge graph 600 shows that the CyberAsset 609 is connected to ten CyberImpact instances, while the rest of the CyberAsset instances (e.g., CyberAsset instances 611, 612 in the knowledge graph 600 are not connected to any CyberImpact nodes. Thus, the CyberAsset instances 611, 612 can be considered as "secure."

Once the ontology is established, data extraction can be performed. A query can be executed to extract elements at risk and the relations that are relevant to the risk propagation task. The query uses M2 constructs to support various domain-specific entities and relations and returns a set of records encoding a relation between a source to a destination element, the risk vector over the source object, and the importance vector of the relation. FIG. 6B shows an example table 650 showing the data extraction output from a knowledge graph (e.g., knowledge graph 600). In the example table 650, an importance vector of one is used for all of the relation instances.

Referring to FIG. 6C, the data shown in Table 660 describes the output of the risk propagation task, from the CyberImpact objects to the CyberAsset objects, then to the ProcessElement objects given the M0 data extracted from the designed ontology. The far-right column of the table 660 encodes the risk vectors for the CyberImpact instances (i.e., the dot-patterned nodes in the example of FIG. 6). Each instance is labeled with a common potential threat in the cyber security context. For instance, a device may stop for a certain period of time (B), or a device may be damaged (C). Such a CyberImpact labeling is grounded on analysis on attack techniques for generic industrial control systems.

Referring to the Process Element nodes in Table 660, the "DoorDisassembly" ProcessElement has a DirectedRisk which is caused by three CyberImpact instances over the "192.168.250.210" Cyber-Asset (denoted in FIG. 6A as "Complex Change of Process Functionality" (A), "Permanent Device Damage" (C), "Leak Project File" (D)). In this example, there are three risk causes. This is due to the maximal risk per aspect, where, given a list of vectors, one total risk vector is formed out of the maximum values for each index across all values. Even though the "Dashboard Installation" ProcessElement is not affected directly by a cyber security risk, the approach can uncover that there is an indirect risk over the DashboardInstallation element derived through its FollowedBy dependency with the DoorDisassembly element.

As shown in FIGS. 6A to 6C, the combination of the generic, domain-specific, and case risk scope can be used to propagate a risk that was measured at the physical level of a system (e.g., a machine breakdown), towards its process abstract level (e.g., productivity).

The risk assessment step enables a user to browse, query, and analyze the input/output graphs. Due to the worst-case scenario approach, only the maximal risk is propagated between nodes. By adopting the maximal risk per aspect, the main causes of risk can be derived as a consequence of the propagation process. Thus, the disclosed techniques can be implemented to identify the root causes of risk, prioritize the mitigation activities, and suggesting a relevant remediation plan. The three scopes together cover physical and process level concepts. Through the exploitation of dependencies and abstraction relations, the approach is able to uncover implicit risk (e.g., followed risk) and direct risk (e.g., explicit risk).

Figure 7:
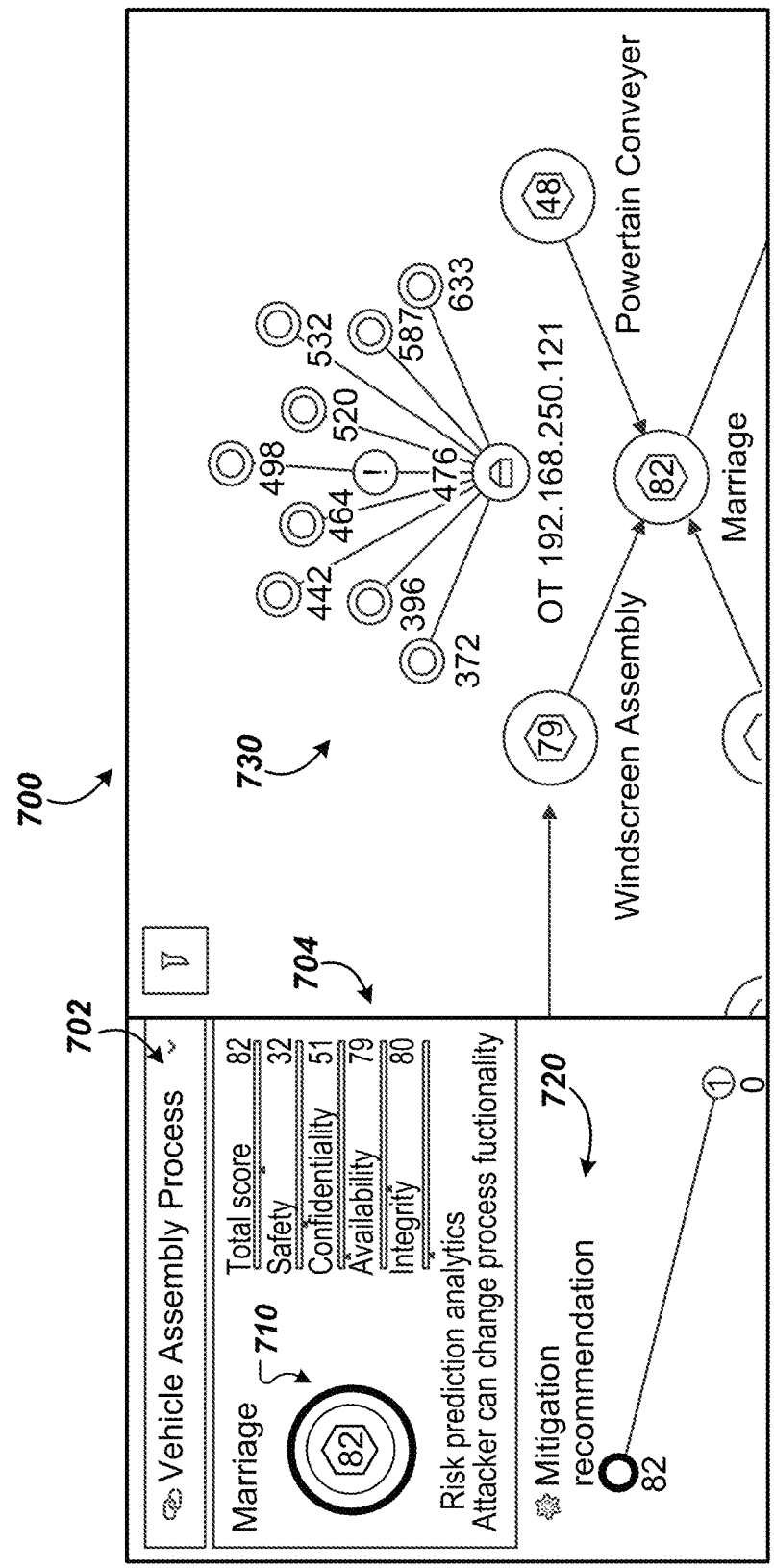
FIG. 7 depicts an example user interface for a use case of implementations of the present disclosure.

FIG. 7 depicts an example user interface 700 for a use case of implementations of the present disclosure. In a cyber domain use case, an attack could trigger an impact over asset's confidentiality. In a production use case, an attack could impact the quality of the resulting product. The example use case in FIG. 7 is a cyber security use case for vehicle assembly processes.

The user interface 700 includes a drop-down menu 702 for selection of vehicle assembly processes. The user interface 700 also provides a depiction of an ontology 730 for the vehicle assembly processes. The ontology 730 includes multiple elements identified by index numbers. The ontology 730 shows multiple processes (WindScreen Assembly, Powertrain Conveyer, Marriage), with each process associated with a respective total risk score. The ontology 730 shows an asset (OT 192.168.250.121) connected to CyberImpacts identified by index numbers.

The user interface 700 also provides a total risk score 710 for the selected process of "Marriage." The user interface 700 presents a report 704 of the risk assessment for the selected process. The report 704 includes a risk value for multiple different risk aspects, including safety, confidentiality, availability, and integrity. The report 704 shows a total risk score, which is a result of the risk scores of the different risk aspects. In the example report 704, higher risk values represent a greater level of risk.

The user interface 700 provides a mitigation recommendation 720 for reducing the risk score of the selected process. The example mitigation recommendation 720 includes a recommended action that would reduce the total risk score of the Marriage process from 82 to zero. In some examples, the mitigation recommendation 720 includes multiple recommended actions. In some examples, the mitigation recommendation 720 specifies a priority of the multiple recommended actions.

Figure 8:
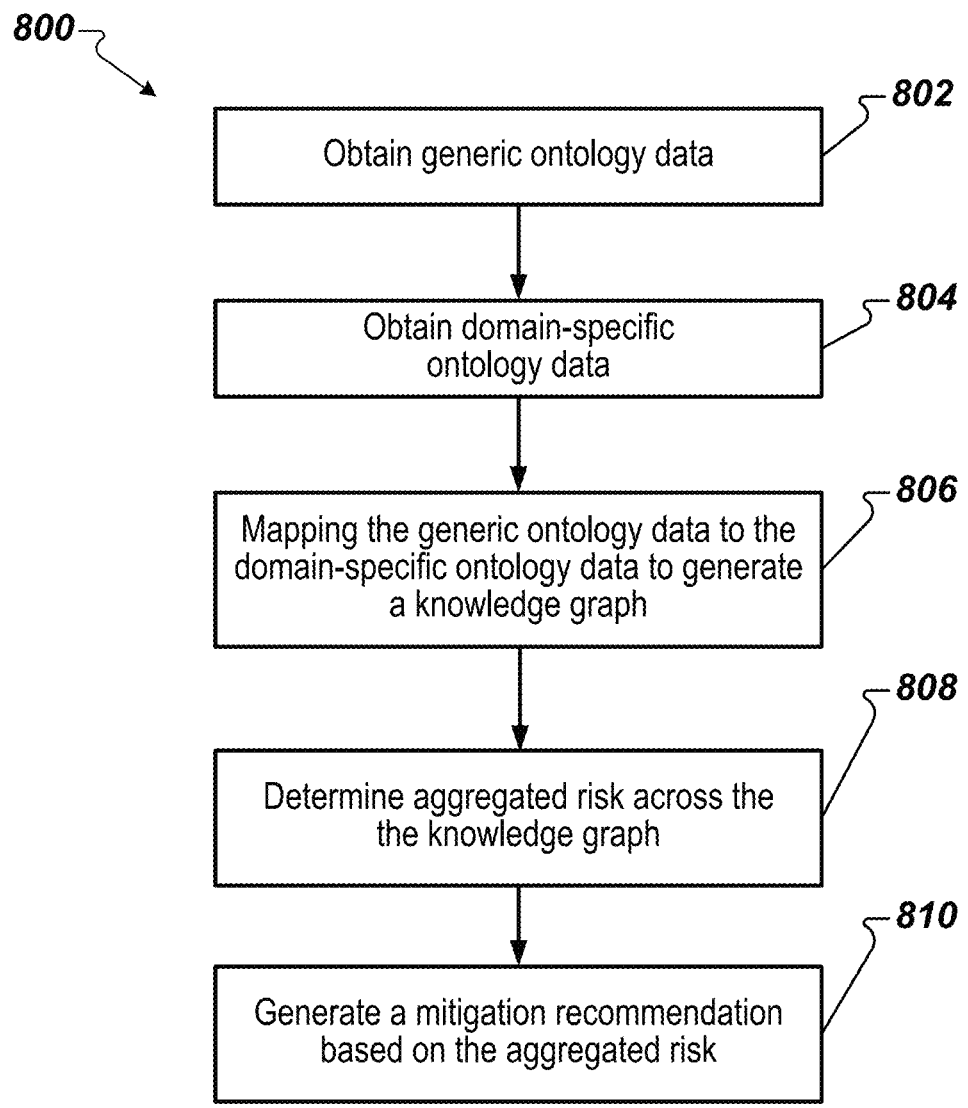
FIG. 8 depicts an example process that can be executed in accordance with implementations of the present disclosure.

FIG. 8 depicts an example process 800 that can be executed in accordance with implementations of the present disclosure. In some implementations, the example process 800 may be performed using one or more computer-executable programs executed using one or more computing devices. The example process 800 can be performed, for example, by the server system 108 of the architecture 100.

Generic ontology data is obtained (802). For example, the design time module 210 can receive generic ontology data defined by an $M_2$ layer, and store the generic ontology data in the design time graph database 214.

Domain-specific ontology data is obtained (804). For example, the design time module 210 can apply the domain-specific extension 212 to the generic ontology data to generate domain specific ontology data defined by an $M_1$ layer.

The generic ontology data is mapped to the domain-specific ontology data to generate a knowledge graph (806). For example, the run time module 220 can perform knowledge graph construction 216 from the raw data 218 using the $M_1$ and $M_2$ layers 217. Thus, knowledge graph data defining a knowledge graph subject to the domain-specific ontology data is generated. The knowledge graph includes nodes and edges between the nodes. The nodes can include asset nodes representing assets and process nodes representing processes.

Each edge can represent a relation between nodes. Relations can include, for example, hierarchy relations, abstraction relations, and process dependency relations. A process dependency relation represents risk propagation through a workflow including multiple processes. A hierarchy relation represents risk propagation from an asset to a process that is correlated with the asset. An abstraction relation represents risk propagation from an asset to a process at a higher level of abstractions.

Aggregated risk is determined across the knowledge graph (808). For example, the risk propagation engine 226 can perform risk propagation analysis 232 across subgraphs of the knowledge graph to determine aggregated risk based on hierarchy and process dependency relationships. The aggregated risk can include multiple types of risk. For example, the aggregated risk can include an availability risk, a confidentiality risk, an integrity risk, and a safety risk. In some examples, the aggregated risk is represented by a vector including risk values for each of the availability risk, the confidentiality risk, the integrity risk, and the safety risk.

In some examples, aggregated risk is determined for a particular process represented by a particular process node of the knowledge graph. To determine the aggregated risk for the particular process, a direct risk is determined for the particular process based on relations between the particular process node and asset nodes of the knowledge graph. In some examples, determining the direct risk for the particular process includes identifying an edge representing a relation between the particular process node and an asset node. The edge may be associated with an importance vector representing an amount of risk propagated from the asset node to the particular process node. Direct risk can be determined by multiplying the importance vector by a risk associated with the asset node.

An indirect risk, or followed risk, is determined for the particular process based on relations between the particular process node and other process nodes of the knowledge graph. Determining the indirect risk for the particular process can include identifying an edge representing a relation between the particular process node and a second process node. The edge may be associated with an importance value representing an amount of risk propagated from the second process node to the first process node. Indirect risk can be determined by multiplying the importance value by a risk associated with the second process node.

The direct risk, indirect risk, and aggregated risk (e.g., total risk), can each be represented by a risk vector. A risk vector can include multiple risk values, with each risk value being associated with a different aspect of risk. Aspects of risk can include, for example, availability risk, confidentiality risk, integrity risk, and safety risk.

In some examples, determining the aggregated risk for the first process includes generating an aggregated risk vector from the direct risk vector for the first process node and the indirect risk vector for the first process node. The aggregated risk vector can be generated by selecting, for each of the different aspects of risk, the maximum risk value between the direct risk vector and indirect risk vector.

A mitigation recommendation is generated based on the aggregated risk (810). For example, the risk propagation engine 226 can output an updated knowledge graph 225 to the runtime graph database 222. The updated knowledge graph 225 can be used to identify recommended actions to reduce the aggregated risk. In some examples, the system executes actions included in the mitigation recommendation. In some examples, the system presents, through a user interface, a graphical representation of the updated knowledge graph 225 and an indication of the mitigation recommendation.

In some examples, a mitigation list is generated. For example, a mitigation simulator can execute a simulation based on the knowledge graph and output a mitigation list. The mitigation list can include a prioritized list of elements that can be mitigated to reduce risk. A set of remediation actions can be determined and/or executed. For example, one or more elements of the mitigation list can be mapped to at least one mitigation action. In some examples, an element-to-mitigation action mapping can be retrieved from computer-readable memory, which identifies remediation actions that can be executed for respective elements. Remediation actions can be automatically executed in accordance with the mitigation recommendation. For example, a remediation action can be executed to mitigate risk resulting from a respective element.

The disclosed techniques leverage the combination of an ontology encoding a set of rules to be used for representing the risk dependencies within a system composed of objects and processes and a method to calculate the propagation of risk within the represented system. Thus, a process-aware risk-propagation approach is used to facilitate the assessment of risk propagation between processes and objects with different levels of abstraction.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for mitigating cyber security risk of an enterprise network, the computer-implemented method being executed by one or more processors and comprising:
   obtaining knowledge graph data defining a knowledge graph including nodes and edges between the nodes, the nodes including asset nodes representing assets and process nodes representing processes; each edge representing a relation between nodes;
   determining, from the knowledge graph, an aggregated risk for a first process represented by a first process node, including:
      identifying, for the first process node, a set of incoming nodes, each incoming node comprising an asset node or a process node and being connected to the first process node by a respective edge;
      determining a direct risk for the first process based on relations between the first process node and asset nodes of the set of incoming nodes; and
      determining an indirect risk for the first process based on relations between the first process node and process nodes of the set of incoming nodes; and
   generating, based on the aggregated risk for the first process node, a mitigation recommendation including one or more actions for reducing the aggregated risk for the first process node.

2. The method of claim 1, wherein determining the direct risk for the first process node based on relations between the first process node and asset nodes of the set of incoming nodes comprises:
   identifying an edge representing a relation between the first process node and a first asset node, the edge being associated with an importance value representing an amount of risk propagated from the first asset node to the first process node; and
   determining the direct risk for the first process node by multiplying the importance value by a risk associated with the first asset node.

3. The method of claim 1, wherein determining the indirect risk for the first process based on relations between the first process node and process nodes of the set of incoming nodes comprises:

identifying an edge representing a relation between the first process node and a second process node, the edge being associated with an importance value representing an amount of risk propagated from the second process node to the first process node; and determining the indirect risk for the first process node by multiplying the importance value by a risk associated with the second process node.

4. The method of claim 1, wherein the direct risk for the first process is represented by a direct risk vector including multiple risk values each risk value being associated with a different aspect of risk.

5. The method of claim 4, wherein aspects of risk include availability risk, confidentiality risk, integrity risk, and safety risk.

6. The method of claim 4, wherein the indirect risk for the first process is represented by an indirect risk vector including multiple risk values, each risk value being associated with the different aspect of risk.

7. The method of claim 6, wherein the aggregated risk for the first process is represented by an aggregated risk vector including multiple risk values, each risk value being associated with the different aspect of risk.

8. The method of claim 7, wherein determining the aggregated risk for the first process comprises generating the aggregated risk vector, including selecting, for each of the different aspects of risk, the maximum risk value between the direct risk vector and indirect risk vector.

9. The method of claim 1, wherein each edge is associated with an importance vector representing an amount of risk propagated between nodes connected by the edge.

10. The method of claim 1, comprising:
obtaining generic ontology data representing classes, properties, and relations for multiple use cases;
generating, from the generic ontology data, domain-specific ontology data representing classes, properties, and relations for a particular use case; and
generating the knowledge graph by mapping the generic ontology data to the domain-specific ontology data.

11. The method of claim 1, wherein each edge represents a hierarchy relation, an abstraction relation, or a process dependency relation.

12. The method of claim 11, wherein a process dependency relation represents risk propagation through a workflow including multiple processes.

13. The method of claim 11, wherein a hierarchy relation represents risk propagation from an asset to a process that is correlated with the asset.

14. The method of claim 11, wherein an abstraction relation represents risk propagation from an asset to a process at a higher level of abstraction.

15. The method of claim 1, comprising:
automatically executing at least one of the one or more actions included in the mitigation recommendation.

16. The method of claim 1, comprising presenting, through a user interface, a graphical representation of the knowledge graph and an indication of the mitigation recommendation.

17. One or more non-transitory computer-readable storage media coupled to one or more processors and having instructions stored thereon which, when executed by the one or more processors, cause the one or more processors to perform operations for mitigating cyber security risk of an enterprise network, the operations comprising:
obtaining knowledge graph data defining a knowledge graph including nodes and edges between the nodes, the nodes including asset nodes representing assets and process nodes representing processes; each edge representing a relation between nodes;
determining, from the knowledge graph, an aggregated risk for a first process represented by a first process node, including:
identifying, for the first process node, a set of incoming nodes, each incoming node comprising an asset node or a process node and being connected to the first process node by a respective edge;
determining a direct risk for the first process based on relations between the first process node and asset nodes of the set of incoming nodes; and
determining an indirect risk for the first process based on relations between the first process node and process nodes of the set of incoming nodes; and
generating, based on the aggregated risk for the first process node, a mitigation recommendation including one or more actions for reducing the aggregated risk for the first process node.

18. The non-transitory computer-readable storage media of claim 17, wherein determining the direct risk for the first process node based on relations between the first process node and asset nodes of the set of incoming nodes comprises:
identifying an edge representing a relation between the first process node and a first asset node, the edge being associated with an importance value representing an amount of risk propagated from the first asset node to the first process node; and
determining the direct risk for the first process node by multiplying the importance value by a risk associated with the first asset node.

19. The non-transitory computer-readable storage media of claim 17, wherein determining the indirect risk for the first process based on relations between the first process node and process nodes of the set of incoming nodes comprises:
identifying an edge representing a relation between the first process node and a second process node, the edge being associated with an importance value representing an amount of risk propagated from the second process node to the first process node; and
determining the indirect risk for the first process node by multiplying the importance value by a risk associated with the second process node.

20. A system, comprising:
one or more processors; and
a computer-readable storage device coupled to the one or more processors and having instructions stored thereon which, when executed by the one or more processors, cause the one or more processors to perform operations for mitigating cyber security risk of an enterprise network, the operations comprising:
obtaining knowledge graph data defining a knowledge graph including nodes and edges between the nodes, the nodes including asset nodes representing assets and process nodes representing processes; each edge representing a relation between nodes;
determining, from the knowledge graph, an aggregated risk for a first process represented by a first process node, including:
identifying, for the first process node, a set of incoming nodes, each incoming node comprising an asset node or a process node and being connected to the first process node by a respective edge;

determining a direct risk for the first process based on relations between the first process node and asset nodes of the set of incoming nodes; and determining an indirect risk for the first process based on relations between the first process node and process nodes of the set of incoming nodes; and generating, based on the aggregated risk for the first process node, a mitigation recommendation including one or more actions for reducing the aggregated risk for the first process node.

\* \* \* \* \*